(12) United States Patent
Srivastava et al.

(10) Patent No.: US 7,013,389 B1
(45) Date of Patent: *Mar. 14, 2006

(54) METHOD AND APPARATUS FOR CREATING A SECURE COMMUNICATION CHANNEL AMONG MULTIPLE EVENT SERVICE NODES

(75) Inventors: Sunil K. Srivastava, Fremont, CA (US); Jonathan Trostle, Cupertino, CA (US); Raymond Bell, Mill Valley, CA (US); Ramprasad Golla, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/407,785

(22) Filed: Sep. 29, 1999

(51) Int. Cl.
*H04L 9/00* (2006.01)

(52) U.S. Cl. ............... 713/163; 713/169; 713/171
(58) Field of Classification Search ........... 713/163
See application file for complete search history.

(56) References Cited

U.S. PATENT DOCUMENTS

| | | | |
|---|---|---|---|
| 4,200,770 A | | 4/1980 | Hellman et al. |
| 4,531,020 A | | 7/1985 | Wechselberger et al. |
| 4,578,531 A | | 3/1986 | Everhart et al. |
| 4,776,011 A | | 10/1988 | Busby |
| 4,881,263 A | * | 11/1989 | Herbison et al. ........... 713/162 |
| 5,309,516 A | | 5/1994 | Takaragi et al. |
| 5,351,295 A | * | 9/1994 | Perlman et al. ............. 713/162 |
| 5,361,256 A | | 11/1994 | Doeringer et al. |
| 5,588,060 A | | 12/1996 | Aziz |

(Continued)

FOREIGN PATENT DOCUMENTS

| | | |
|---|---|---|
| EP | 0 952 718 A2 | 10/1990 |
| EP | 0 994 600 A2 | 4/2000 |

OTHER PUBLICATIONS

IEEE Transactions On Information Theory, vol. IT–22, No. 6 (Nov. 1976) entitled "New Directions in Cryptography" by Whitfield Diffie and Martin E. Hellman.

Proceedings of the IEEE, vol. 76, No. 5 (May 1988) entitled "The First Ten Years of Public–Key Cryptography" by Whitfield Diffie.

MIT/LCS/TM–537, Laboratory for Computer Science (Aug. 1995) entitled "Guaranteed Partial Key–Escrow", Handout #13, by Silvio Micali.

(Continued)

*Primary Examiner*—Gregory Morse
*Assistant Examiner*—Christopher J. Brown
(74) *Attorney, Agent, or Firm*—Hickman Palermo Truong & Becker LLP

(57) ABSTRACT

An approach for establishing secure multicast communication among multiple event service nodes is disclosed. The event service nodes, which can be distributed throughout an enterprise domain, are organized in a logical tree that mimics the logical tree arrangement of domains in a directory server system. The attributes of the event service nodes include the group session key and the private keys of the event service nodes that are members of the multicast or broadcast groups. The private keys provide unique identification values for the event service nodes, thereby facilitating distribution of such keys. Because keys as well as key version information are housed in the directory, multicast security can readily be achieved over any number of network domains across the entire enterprise. Key information is stored in, and the logical tree is supported by, a directory service. Replication of the directory accomplishes distribution of keys. Event service nodes may obtain current key information from a local copy of the replicated directory.

26 Claims, 16 Drawing Sheets

U.S. PATENT DOCUMENTS

| | | | |
|---|---|---|---|
| 5,588,061 | A | 12/1996 | Ganesan et al. |
| 5,600,642 | A | 2/1997 | Pauwels et al. |
| 5,630,184 | A | 5/1997 | Roper et al. |
| 5,633,933 | A | 5/1997 | Aziz |
| 5,663,896 | A | 9/1997 | Aucsmith |
| 5,724,425 | A | 3/1998 | Chang et al. |
| 5,748,736 | A * | 5/1998 | Mittra .................. 713/163 |
| 5,761,305 | A | 6/1998 | Vanstone et al. |
| 5,805,578 | A | 9/1998 | Stirpe et al. |
| 5,841,864 | A | 11/1998 | Klayman et al. |
| 5,850,451 | A | 12/1998 | Sudia |
| 5,889,865 | A | 3/1999 | Vanstone et al. |
| 5,920,630 | A | 7/1999 | Wertheimer et al. |
| 5,987,131 | A | 11/1999 | Clapp |
| 6,009,274 | A * | 12/1999 | Fletcher et al. ............. 717/173 |
| 6,049,878 | A * | 4/2000 | Caronni et al. ............. 713/201 |
| 6,055,575 | A | 4/2000 | Paulsen et al. |
| 6,088,336 | A | 7/2000 | Tosey |
| 6,119,228 | A | 9/2000 | Angelo et al. |
| 6,151,395 | A | 11/2000 | Harkins |
| 6,216,231 | B1 | 4/2001 | Stubblebine |
| 6,226,383 | B1 | 5/2001 | Jablon |
| 6,240,188 | B1 | 5/2001 | Dondeti et al. |
| 6,256,733 | B1 | 7/2001 | Thakkar et al. |
| 6,263,435 | B1 | 7/2001 | Dondeti et al. |
| 6,272,135 | B1 | 8/2001 | Nakatsugawa |
| 6,279,112 | B1 | 8/2001 | O'Toole, Jr. et al. |
| 6,295,361 | B1 | 9/2001 | Kadansky et al. |
| 6,330,671 | B1 | 12/2001 | Aziz |
| 6,332,163 | B1 | 12/2001 | Bowman-Amuah |
| 6,363,154 | B1 | 3/2002 | Peyravian et al. |
| 6,483,921 | B1 | 11/2002 | Harkins |
| 6,507,562 | B1 | 1/2003 | Kadansky et al. |
| 6,584,566 | B1 | 6/2003 | Hardjono |
| 6,633,579 | B1 | 10/2003 | Tedijanto et al. |
| 6,636,968 | B1 | 10/2003 | Rosner et al. |
| 6,643,773 | B1 * | 11/2003 | Hardjono .................. 713/153 |
| 6,684,331 | B1 | 1/2004 | Srivastava |

OTHER PUBLICATIONS

Proceedings of the Fouth Annual Conference on Computer and Communications Security, ACM, 1997 (Nov. 1996) entitled "Verifiable Partial Key Escrow" by Mihir Bellare and Shafi Goldwasser.

Federal Information Processing Standards Publication 185 (Feb 9, 1994) entitled "U.S. Department of Commernce/ National Institute of Standards and Technology", Escrowed Encryption Standard, Category: Telecommunications Security.

Cylink Corporation Resouces entitled "Alternatives to RSA: Using Diffie–Hellman with DSS".

* cited by examiner

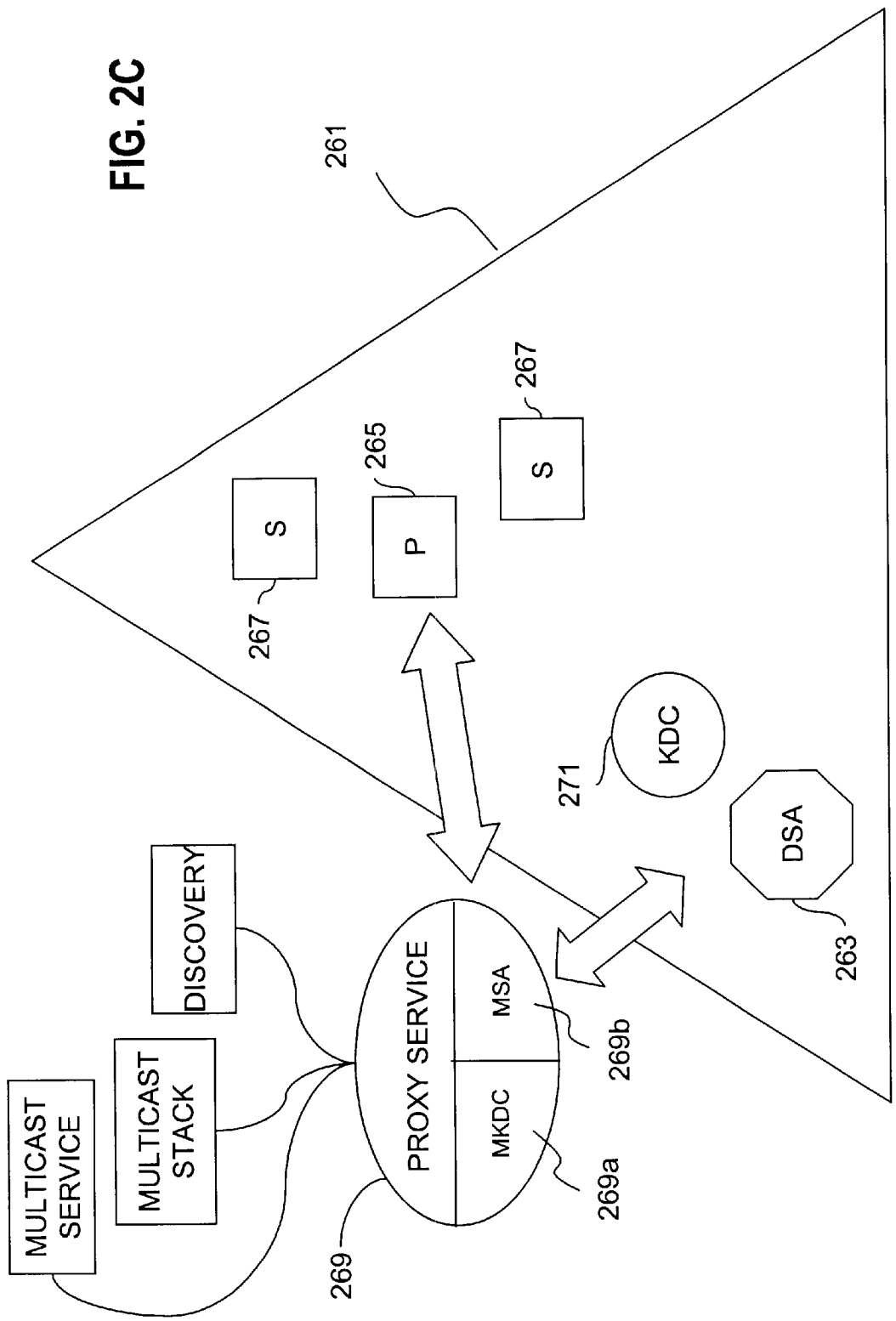

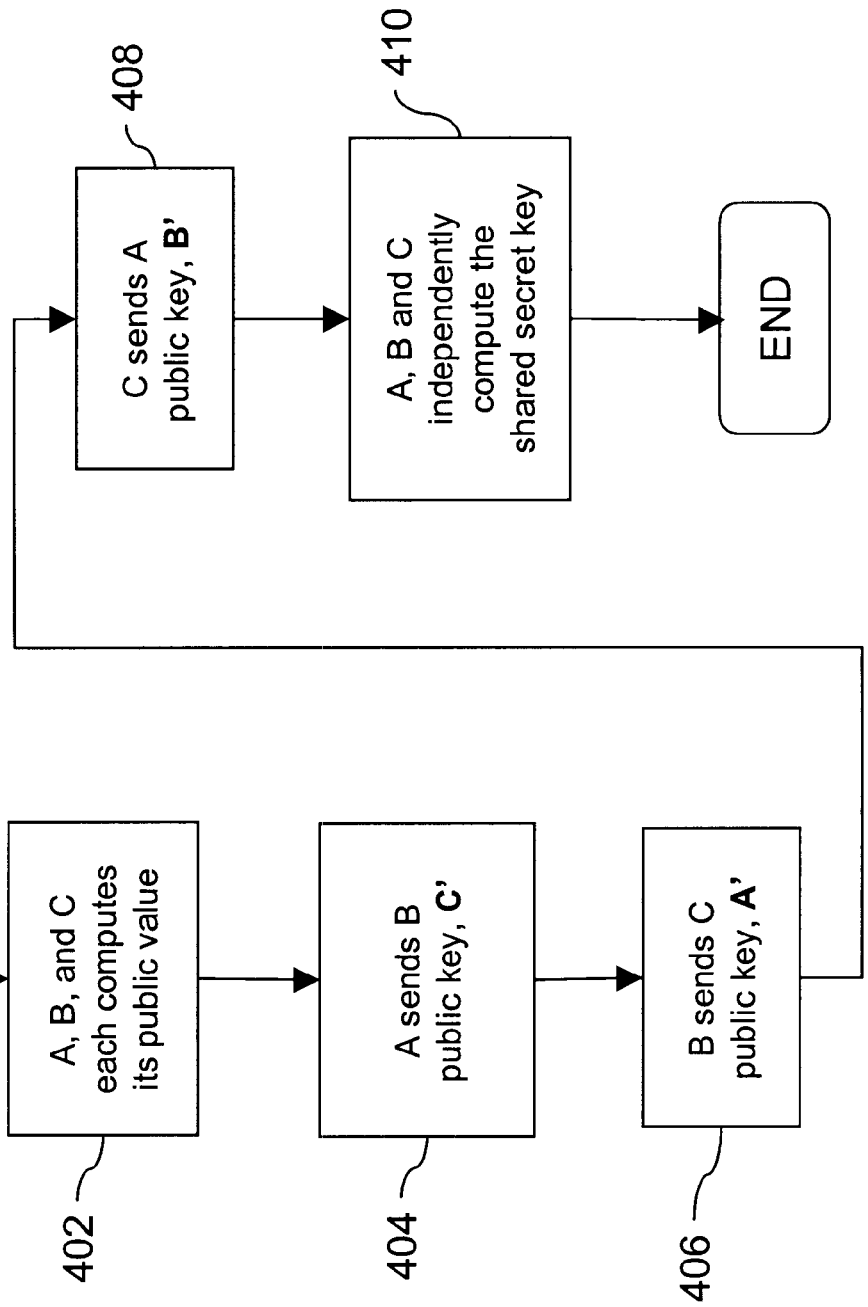

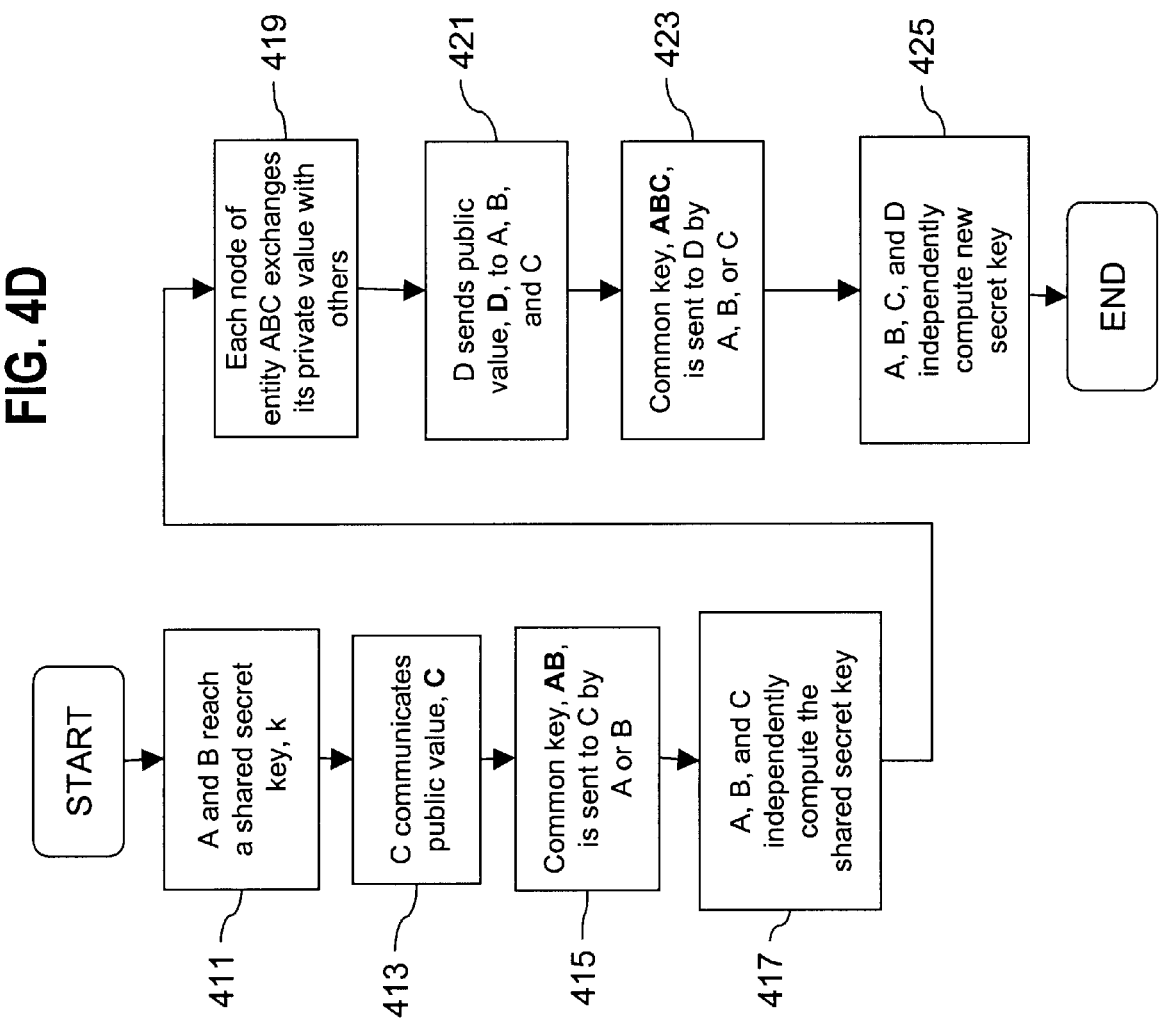

METHOD AND APPARATUS FOR CREATING A SECURE COMMUNICATION CHANNEL AMONG MULTIPLE EVENT SERVICE NODES

FIELD OF THE INVENTION

The invention generally relates to secure network communication systems. The invention relates more specifically to a method and apparatus for creating a secure channel among multiple event service nodes in a network, including session key distribution that provides secure communication among broadcast or multicast groups using private keys that serve as identifiers.

BACKGROUND OF THE INVENTION

The proliferation of network computing has shaped how society conducts business and personal communication. As reliance on computer networks grows, the flow of information between computers continues to increase in dramatic fashion. Accompanying this increased flow of information is a proportionate concern for network security. Commercial users, who regularly conduct business involving the exchange of confidential or company proprietary information over their computer networks, demand that such information is secure against interception by an unauthorized party or to intentional corruption. In addition, with the acceptance of electronic commerce over the global Internet, all users recognize the critical role cryptographic systems play in maintaining the integrity of network communication.

Cryptography is the art and science of keeping messages secure. A message is information or data that is arranged or formatted in a particular way. In general, a message, sometimes referred to as "plaintext" or "cleartext," is encrypted or transformed using a cipher to create "ciphertext," which disguises the message in such a way as to hide its substance. In the context of cryptography, a cipher is a mathematical function that can be computed by a data processor. Once received by the intended recipient, the ciphertext is decrypted to convert the ciphertext back into plaintext. Ideally, ciphertext sufficiently disguises a message in such a way that even if the ciphertext is obtained by an unintended recipient, the substance of the message cannot be discerned from the ciphertext.

Many different encryption/decryption approaches for protecting information exist. In general, the selection of an encryption/decryption scheme depends upon the considerations such as the types of communications to be made more secure, the particular parameters of the network environment in which the security is to be implemented, and desired level of security. An important consideration is the particular system on which a security scheme is to be implemented since the level of security often has a direct effect on system resources.

For example, for small applications that require a relatively low level of security, a traditional restricted algorithm approach may be appropriate. With a restricted algorithm approach, a group of participants agree to use a specific, predetermined algorithm to encrypt and decrypt messages exchanged among the participants. Because the algorithm is maintained in secret, a relatively simple algorithm may be used. However, in the event that the secrecy of the algorithm is compromised, the algorithm must be changed to preserve secure communication among the participants. Scalability, under this approach, is an issue. As the number of participants increases, keeping the algorithm secret and updating it when compromises occur place an undue strain on network resources. In addition, standard algorithms cannot be used since each group of participants must have a unique algorithm.

To address the shortcomings of traditional restricted algorithm approaches, many contemporary cryptography approaches use a key-based algorithm. Generally two types of key-based algorithms exist: (1) symmetric algorithms and (2) asymmetric algorithms, of which one example is a public key algorithm. As a practical matter, a key forms one of the inputs to a mathematical function that is used by a processor or computer to generate a ciphertext.

Public key algorithms are designed so that the key used for encryption is different than the key used for decryption. These algorithms are premised on the fact that the decryption key cannot be determined from the encryption key, at least not in any reasonable amount of time with practical computing resources. Typically, the encryption key (public key) is made public so that anyone, including an eavesdropper, can use the public key to encrypt a message. However, only a specific participant in possession of the decryption key (private key) can decrypt the message.

Public key algorithms, however, often are not employed as a mechanism to encrypt messages, largely because such algorithms consume an inordinate amount of system resources and time to encrypt entire messages. Further, public key encryption systems are vulnerable to chosen-plaintext attacks, particularly when there are relatively few possible encrypted messages.

As a result, a public key cryptosystem generally is utilized to establish a secure data communication channel through key exchanges among the participants. Two or more parties, who wish to communicate over a secure channel, exchange or make available to each other public (or non-secure) key values. Each party uses the other party's public key value to privately and securely compute a private key, using an agreed-upon algorithm. The parties then use their derived private keys in a separate encryption algorithm to encrypt messages passed over the data communication channel. Conventionally, these private keys are valid only on a per communication session basis, and thus, are referred to as session keys. These session keys can be used to encrypt/decrypt a specified number of messages or for a specified period of time.

A typical scenario involves participants A and B, in which user A is considered a publisher of a message to a subscriber, user B. The public key algorithm used to establish a secure channel between publisher, A, and subscriber, B, is as follows:

1. B provides a public key, B, to A.
2. A generates a random session key SK, encrypts it using public key B and sends it to B.
3. B decrypts the message using private key, b (to recover the session key SK).
4. Both A and B use the session key SK to encrypt their communications with each other; after the communication session, A and B discard SK.

The above approach provides the added security of destroying the session key at the end of a session, thereby, providing greater protection against eavesdroppers.

Once a multicast group is established, management of the sessions keys due to membership changes poses a number of problems. Forward secrecy, which arises when a member node leaves the multicast group and may still possess the capability to decipher future messages exchanged among the group, becomes a concern. In addition, in the case where a new member node enters the multicast group, the new member should not be permitted to decrypt the past messages of the multicast group. Another consideration involves making session key updates when a "join" or "leave" occurs; updates must be rapid to prevent undue system delay. This issue relates to how well the network scales to accommodate additional users.

Another conventional technique used to establish secure communication employs a trusted third party authentication mechanism, such as a certificate authority ("CA") or key distribution center ("KDC") to regulate the exchange of keys. FIG. 9 is a block diagram of a system that uses a single central group controller (GC) 901 that has responsibility for distributing, creating, and updating session keys to members of the multicast group (users A–H). The eight users, A–H, communicate with group controller 901 via separate point-to-point connections 903 to obtain a dynamic group session key. The channels 903 can be made secure by using a standard Diffie-Hellman key exchange protocol.

The group controller preferably comes to a shared Group Session key using a binary tree approach. The KDC or CA carries out a third party authentication. The keys can be sent in a multicast or broadcast messages or overlapping broadcast or multicast messages or many point to point messages. Diffie-Hellman is not required to secure communications with the group controller; the binary tree approach provides it. Ideally, only one message from the group controller is needed.

Alternatively, Diffie-Hellman is used to do a point to point communication with the CA or KDC, and the CA or KDC can give out a group session key without using the binary tree approach. All nodes get the same session key using N–1 point to pint messages. These two approaches are orthogonal and can be combined for optimization.

To set up the secured channel among the nodes, N–1 messages are exchanged, wherein N is the number of nodes. Although this is relatively low overhead in terms of messages exchanged, a major drawback is that the centralized group controller 901 represents a single point of failure, and therefore the system lacks fault tolerance. If the group controller 901 is down, no secure communication can exist among the multicast group of users A–H. Such a prospect is unacceptable, especially in mission critical systems.

Another drawback is that the group controller 901 is a potential bottleneck in the network when a binary tree algorithm is used, and the KDC or CA are potential bottlenecks when other mechanisms are used. For instance, if multiple nodes request to join the multicast group, the controller 901 may not be able to process all such requests in a timely manner. This problem may be acute if the multicast group is over a wide area network (WAN). Further, a system dependent upon a group controller 901 is not easily enlarged or scaled, due, in part, to physical hardware constraints.

A binary tree approach is disclosed in co-pending application Ser. No. NUMBER3, entitled "METHOD AND APPARATUS FOR CREATING A SECURE COMMUNICATION CHANNEL AMONG MULTIPLE PROXY MULTICAST SERVICE NODES," filed concurrently herewith, and naming as inventors Sunil K. Srivastava, Jonathan Trostle, Raymond Bell, and Ramprasad Golla, the entire disclosure of which is hereby incorporated by reference as if fully set forth herein. The binary tree approach described therein makes it possible to scale a secure communication system to large multicast groups, with less overhead involved in transmission of new group session keys when members join in a multicast group. Advantageously, each affected member does only $\log_2 N$ decryption operations; further, when a member joins or leaves, the central group controller, which acts as a group membership coordinator, sends only a subset of keys to existing group members on an affected tree branch. All keys that are affected can be sent, ideally, in one multicast or broadcast message, and only keys that correspond to a particular node will be decrypted by that node.

One issue with this approach, however, is that the central group controller presents a single point of failure. The KDC and CA also present a single point of failure in approaches that do not use a binary tree mechanism.

Based upon the foregoing, there is a clear need for improved approaches to key exchange that eliminate a single point of failure, especially among broadcast or multicast group members.

There is also a need for an approach for providing a secure communication channel among a group controller, KDC, or CA so that the group controller, KDC or CA may be distributed. Since the group controller, KDC, and CA normally are essential for establishing any secure channel, this need presents a circular or "chicken and egg" type of paradox.

In particular, there is an acute need for an improved approach to enhance scalability and fault tolerance, particularly over a WAN.

Based on the need to provide secure communication while limiting the adverse effects on system resources and the limitations in the prior approaches, an approach for providing secure communication that provides a relatively high level of security while requiring relatively fewer system resources and time to perform is highly desirable.

SUMMARY OF THE INVENTION

According to one aspect, a method is provided for managing addition of a first event service node to a secure multicast group that includes a plurality of other event service nodes in a communication network, wherein each of the event service nodes is capable of establishing multicast communication and serving as a key distribution center, wherein each event service node is created and stored within a domain of a directory server system, wherein each event service node is logically organized in a binary tree having a root node, intermediate nodes, and leaf nodes, wherein one of the event service nodes is a group controller and is represented by the root node, and wherein the other event service nodes are represented by the leaf nodes. In one embodiment of this aspect, the method involves the steps of authenticating the first event service node with a subset of the event service nodes that are affected by an addition of the first event service node to the multicast group, based on key information stored in a directory; receiving a plurality of private keys from the subset of nodes; generating a new private key for the first event service node; communicating the plurality of private keys and the new private key to the first event service node; communicating a message to the subset of nodes that causes the subset of nodes to update their private keys.

The method comprises authenticating the plurality of event service nodes via a directory that includes a directory system agent (DSA) for communicating with one or more of the event service nodes. The directory further includes a replication service agent (RSA) for replicating attribute information of the one or more event service nodes. Each of the event service nodes is capable of establishing multicast communication and serving as a key distribution center.

The method also includes creating a logical arrangement of the plurality of event service nodes according to a tree structure. The tree structure mimics the tree organization of domains in a directory server system. The tree structure has a root node, intermediate nodes, and leaf nodes, wherein one of the event service nodes is designated as a primary event service node. The primary event service node is mapped to the root node, and the other event service nodes are mapped to the intermediate nodes and the leaf nodes. Private keys are generated for each of the intermediate nodes and leaf nodes; the private keys provide unique identification of the nodes within the tree structure. The private keys are N bits in length, wherein each bit corresponds to one of the private keys—where N is an integer.

The method includes generating a group session key for establishing the secure multicast or broadcast group among the event service nodes. The group session key is distributed among the event service nodes based upon the corresponding private keys. The attribute information comprises the group session key and the private keys. Under this arrangement, the event service nodes (i.e., group controllers) can readily scale over a number of different environments.

According to another aspect, a communication system for creating a secure multicast or broadcast group comprises a plurality of event service nodes. Each of the event service nodes has attribute information comprising a group identification value for uniquely identifying a particular one of the event service nodes, wherein the plurality of event service nodes form a logical arrangement of the event service nodes according to a tree structure. The tree structure has a root node, intermediate nodes, and leaf nodes. One of the event service nodes is designated as a primary event service node, which is mapped to the root node. The other event service nodes have private keys corresponding to the group identification values of N bits and are mapped to the intermediate nodes and the leaf nodes. N is an integer number. A directory comprises a directory system agent (DSA) for communicating with one or more of the event service nodes to authenticate each of the event service nodes and a replication service agent (RSA) for replicating the attribute information of the one or more event service nodes. One of the event service nodes generates a group session key for establishing the secure multicast or broadcast group among the plurality of event service nodes. The group session key is distributed to the event service nodes based upon respective private keys. The attribute information includes the group session key and the private keys. Such an arrangement provides a scalable, secure multicast group of event service nodes.

In yet another aspect, a computer system for establishing a secure multicast or broadcast group comprises a communication interface for communicating with a plurality of external computer systems and for interfacing a directory to authenticate the computer system and the plurality of external computer systems. The directory includes a directory system agent (DSA) for communicating with the computer system and a replication service agent (RSA) for replicating attribute information associated with the computer system. A bus is coupled to the communication interface for transferring data. One or more processors are coupled to the bus for selectively generating a group session key and private keys corresponding to the plurality of external computer systems, and for logically operating with the plurality of external computer systems according to a tree structure. The tree structure has a root node, intermediate nodes, and leaf nodes. The computer system is mapped to the root node, and the plurality of external computer systems is mapped to the intermediate nodes and the leaf nodes. The corresponding private keys, which are N bits in length, provide unique identification of the respective plurality of external computer systems within the tree structure—where N is an integer. The group session key is distributed based upon the corresponding private keys. A memory is coupled to the one or more processors via the bus. The memory includes one or more sequences of instructions which when executed by the one or more processors cause the one or more processors to perform the step of—selectively updating the group session key and the private keys in response to whether a new client joins or a one of the client nodes leaves the multicast or broadcast group. The above computer system provides a scalable network of group controllers for creating multicast secure communication channels.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A, FIG. 2B, and FIG. 2C are block diagrams of a secure network utilizing a group controller.

FIG. 4A, FIG. 4B, FIG. 4C, and FIG. 4D are diagrams illustrating methods for key exchange.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

An approach for creating a secured multicast or broadcast group in a communications network uses a distributed system to disseminate and update group session keys. To establish a secured channel among the participating multicast group members, a group controller approach is used. However, functionality of the group controller is distributed across multiple entities, which themselves communicate over a secure channel. The entities, which make up the group controller, use various key exchange algorithms to securely communicate. The key exchange protocols generate session keys based on a public key scheme, without needing to rely on a group controller approach. Further, the approach exploits the commonality between the physical topology of directory based domains (as well as multicast routing trees) and the structure of a binary tree to generate a network of group controllers that efficiently manages membership within a secure multicast or broadcast group.

In a basic public key encryption approach, a group of participants publish their public keys, for example, in a database, and maintain their own private keys. These participants can access the database to retrieve the public key of the participant to whom they want to send a message and use it to encrypt a message destined for that participant. Unfortunately, the database, even if secure, is vulnerable to key substitution during transmission of the keys.

This problem is alleviated by using a trusted intermediary, called a Central Authority (CA), Key Distribution Center (KDC) or Group Controller (GC), which has the responsibility of distributing the stored public keys to the multicast or broadcast group members. The KDC accomplishes this task by encrypting the public keys with its private key, which is shared with each of the group members. The group members then decipher the encrypted message to determine each others' public keys. In addition to publishing public keys by which session keys may be derived by the group members, the KDC may distribute actual session keys.

Figure 1:
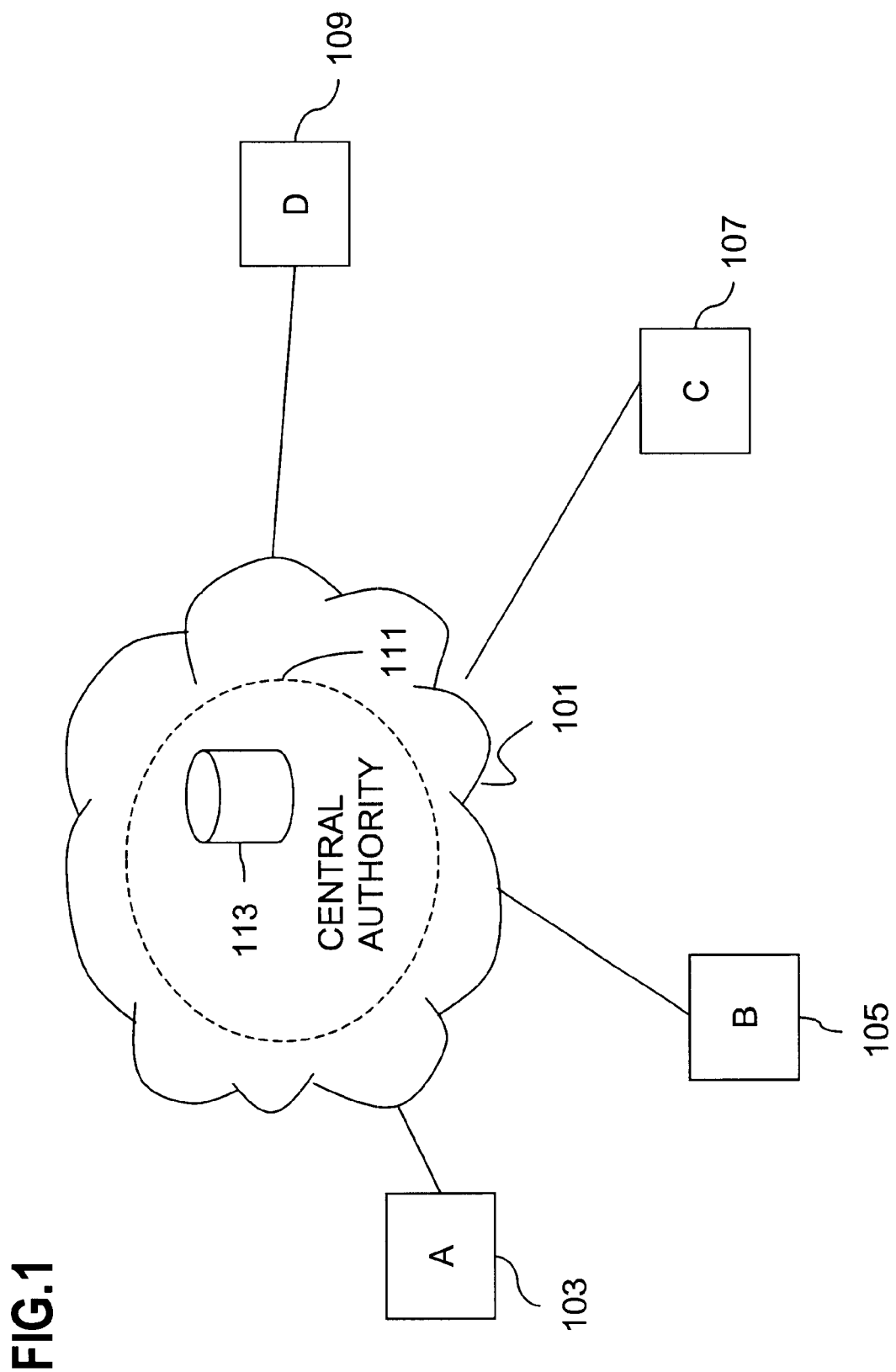
FIG. 1 is a block diagram of a secure communication system employing a central authority such as a key distribution center (KDC).

FIG. 1 shows an exemplary implementation with four users A, B, C, D connected via network 101. The network 101 may be a packet switched network, which supports the Internet Protocol (IP). A Central Authority 111, which is a third party trusted authentication authority, is hosted in network 101. In a preferred embodiment, Central Authority 111 is a distributed multicast subnetwork made up of multiple KDCs, CAs, or GCs that are interconnected over secured channels in a hierarchical relationship. Among other functions, the Central Authority 111 provides authentication and validation services when individual nodes join the multicast or broadcast group. Although four (4) users A, B, C, D are shown as an example, any number of users or nodes can be used.

Central Authority 111 may be a KDC subnetwork in an environment that uses an exchange of Kerberos credentials for communications security. However, any other suitable central authority mechanism may be substituted. For example, a certificate authority (CA) may be used as Central Authority 111 when a public key infrastructure (PKI) is used for communications security in the network.

Central Authority 111 establishes point-to-point communication with the workstations 103, 105, 107, 109 to authenticate them. Workstations 103, 105, 107, 109 obtain dynamic session keys from the Central Authority 111 for subsequent secure communication among themselves. In this case, Central Authority 111 generates the session key. Alternatively, one of the nodes 103, 105, 107, 109, which initiates communication with the multicast group, may generate and supply a dynamic group key based on a symmetrical cryptographic algorithm to the Central Authority 111. Thereafter, other nodes seeking to participate in the secure communication may do so by requesting this group session key from the Central Authority 111, distributes it using secured point-to-point communication.

For purposes of illustration, assume that user A desires to publish a message to the other users B, C, D. As a publisher, user A encrypts the message with the dynamic group session key and signs a message digest with its private key. The message digest can include a time-stamp and serial numbers for authentication purposes. If user A is trusted by the other users B, C, D, user A itself can assume the role of a KDC.

If each of the members of the multicast group (e.g., A, B, C, D) can be either a publisher or a subscriber, then each individual group member can employ the group session key when it publishes a message. Subscribers are required to know the group session key to decrypt the message. Normally the group session key is not used as a signature because it could be used to spoof a publisher and send an unauthorized message. Accordingly, third party authentication is used and message signatures are constructed from a publisher's private key, message digest and time stamp.

In an exemplary embodiment, the group members initially authenticate themselves by using a certificate authority (CA) or a Kerberos KDC, in which case the session keys need not serve as authentication signatures or certificates. Kerberos is a known key based authentication service. The directory can provide Kerberos service on a number of operating systems (e.g., Windows, UNIX, etc.). A CA may be used with the Secure Sockets Layer Service Provider Interface (SSL-SPI) and SSL, TLS or Kerberos providers may be used with the Generic Security Service Application Programming Interface (GSS-API).

Central Authority 111, like the GC or KDC, in a preferred embodiment, is a distributed Multicast KDC (MKDC), whereby a designated or root MKDC tracks group membership information and conveys such information to the other MKDCs. Each of the MKDCs serves its own geographic region of users. Central Authority 111 is an interconnection of MKDCs over secured channels, which are arranged in a hierarchical relationship overlapping LDAP domains, network domains, router trees and reliable transport trees. The secure channels linking the MKDCs are established using a public key exchange protocol, such that participants in the exchange can derive a common group key without intervention from a third party, such as another group controller. Alternatively, protocols such as broadcast Diffie-Hellman can be used to establish the secure channels. MKDCs are suited to take advantage of such protocols because they are static with respect to joins and leaves from the multicast group. Thus, the frequency of a MKDC joining and leaving a group of MKDCs is relatively low. Further, MKDCs are inherently trusted systems. In Distributed Directory Service Replications, they build secure channels among themselves.

In one embodiment, the Central Authority 111 is a distributed, near-statically replicated or low latency directory, which provides the services of the KDC. In general, a directory creates active associations among users, applications, a network, and network devices. A directory is a logically centralized, highly distributed data repository that can be accessed by the applications. The distributed nature of directories is achieved by replicating data across multiple directory servers, which are strategically located throughout the network, in part, based upon traffic engineering considerations. Directories can represent network elements, services, and policies to enable ease of network administration and security. In particular, a directory can supply authentication services, whereby all users, applications, and network devices can authenticate themselves through a common scheme.

A directory server can be implemented as a distributed, replicated, object database, in which one or more master copies of the database is maintained along with a number of replicas. One type of directory is Microsoft Active Directory from Microsoft Corporation. Active Directory is a directory that uses a data storage schema as defined by the Directory-Enabled Networks (DEN) definition, and is based upon Lightweight Directory Access Protocol (LDAP). LDAP is a directory standard that is based upon the ITU (International Telecommunications Union) X.500 standard. LDAP provides client access to X.500 directory servers over a TCP/IP (Transmission Control Protocol/Internet Protocol) based network. The details of LDAP are set forth in RFC 1777 and RFC 2251, which are hereby incorporated by reference in its entirety as if fully set forth herein. X.500 employs a distributed approach storing information locally in Directory System Agents (DSAs).

In the system of FIG. 1, the directory may contain user account or security principal information for authenticating users or services along with the shared secret key between the members A, B, C, D and the directory. This information may be stored in a database 113, which can reside within each KDC or can be shared among two or more KDCs. Users A, B, C, D authenticate themselves using the security services of the directory. Further, some of the directories can serve as CAs, or work cooperatively with CAs. The secured channels within the Central Authority 111 can be established using the key exchange method discussed below with respect to FIG. 4A, FIG. 4B, FIG. 4C, FIG. 4D.

Figure 2A:
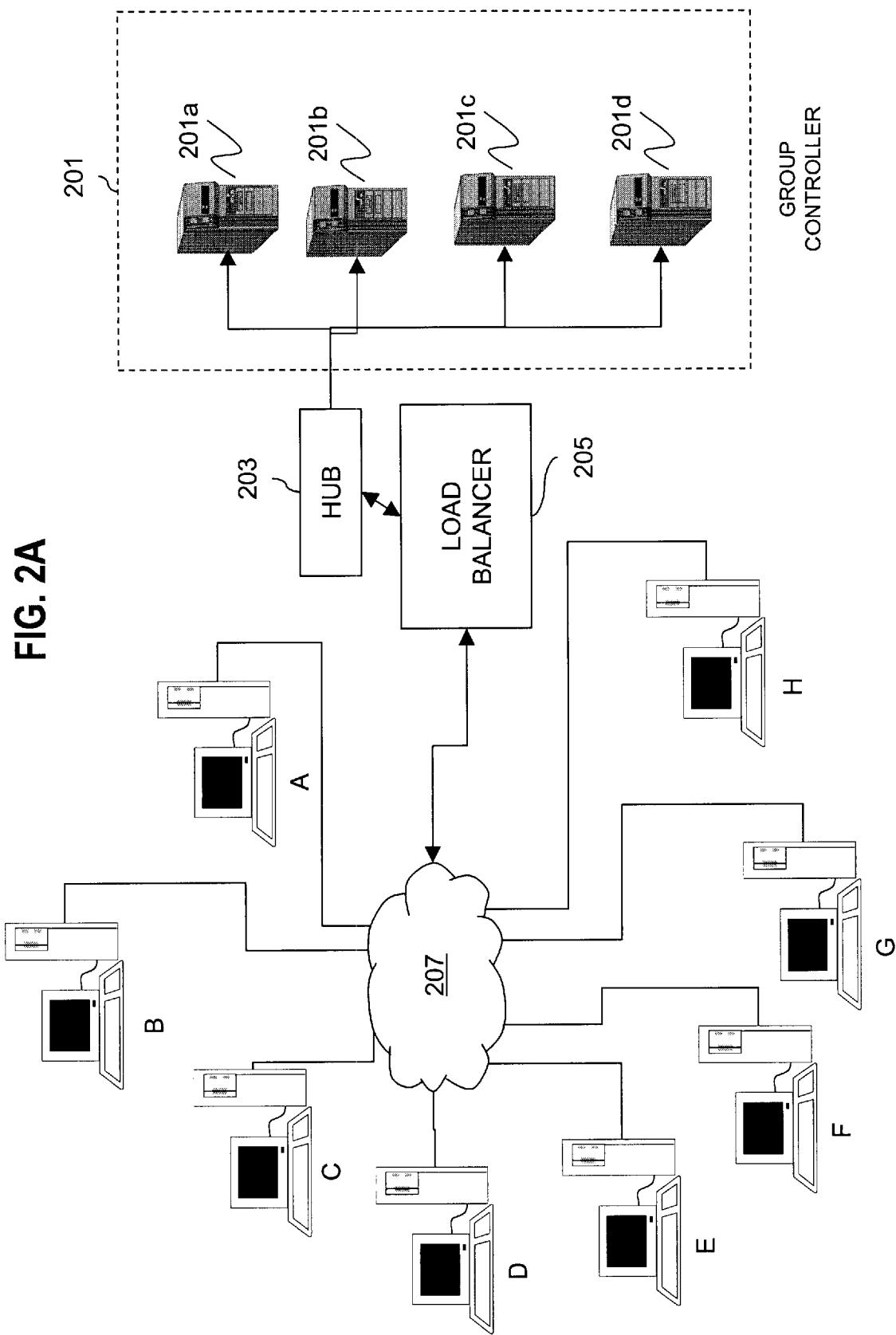

FIG. 2A shows an exemplary embodiment of a clustered central KDC, CA or GC. The clustered central KDC 201 is shown in the form of a "server farm," comprising multiple KDC servers 201a–201d. KDC servers 201a–201d communicate through a hub 203, which may be use any suitable LAN technology such as Ethernet or token ring. A load balancer 205 is linked to hub 203 to load balance the traffic from network 207, which in this example is an IP network. The load balancer 205 provides virtual server capability to represent KDC 201 as single entity to the users A–H. Thus, KDC 201 effectively has a single address, such as one IP address. The load balancer 205 can effectively direct traffic across all the KDC servers 201a–201d by mapping the one virtual IP address to the true addresses of the individual servers. With this approach, additional KDC servers can be readily added to supply security services to new users, thereby improving scalability. Normally the load balancer 205 is implemented as an IP layer router or switch.

Figure 2B:
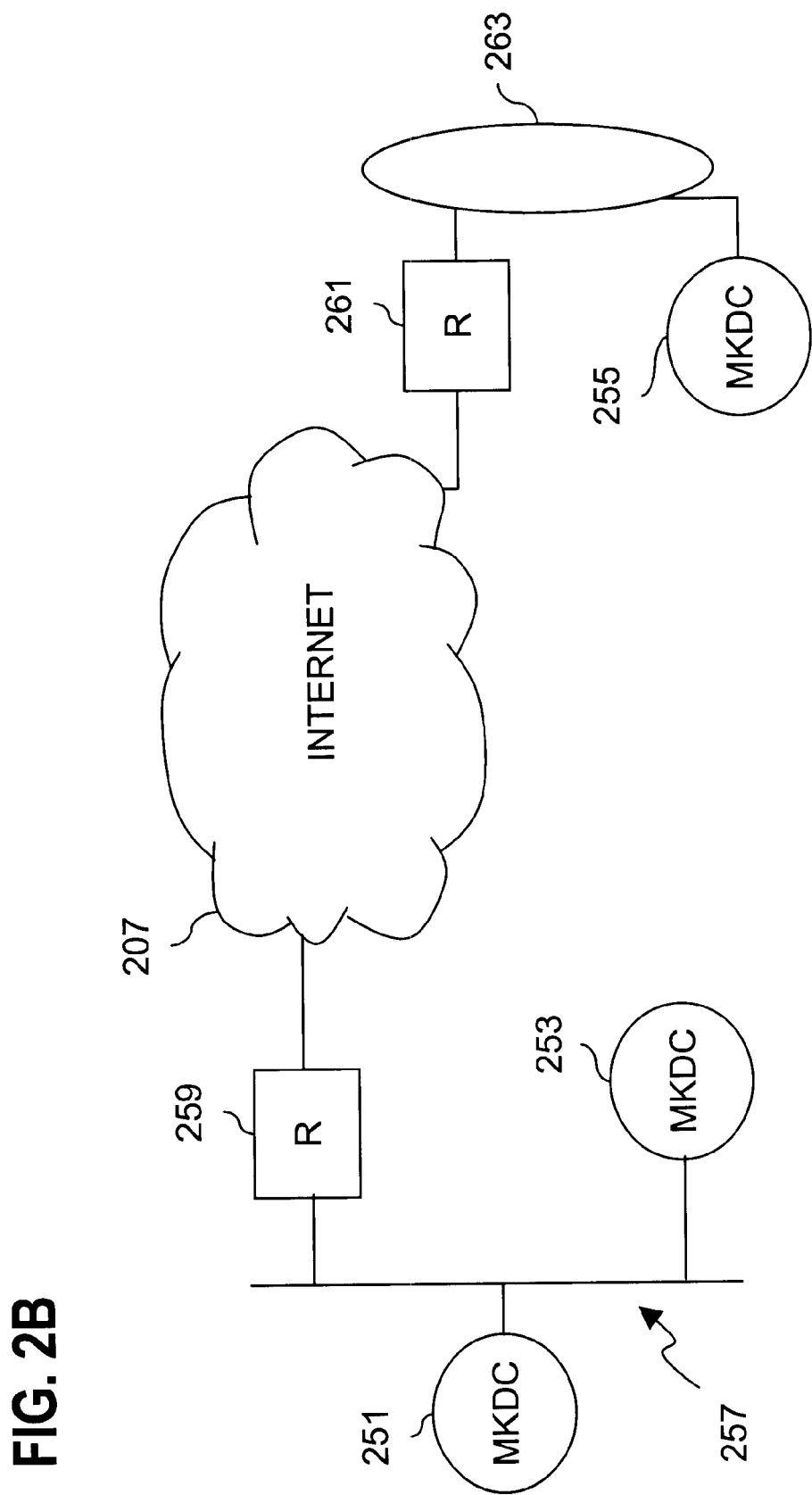

FIG. 2B shows another way to scale a system in which MKDCs 251, 253, 255 are distributed over a network at the LAN and/or WAN level. The MKDCs can be within the same or different domains. A domain is defined as a network or subnetwork that is under control by a single network management entity.

To effectively serve users, MKDCs 251, 253, 255 communicate over secure channels themselves to exchange dynamic group session keys. In this exemplary enterprise network, MKDC 251 and MKDC 253 are connected via an Ethernet LAN 257, which is further linked to a network 207, such as the global packet switched network known as the Internet, through router 259. Another MKDC 255 resides on a remote LAN 263. FIG. 2B shows LAN 263 as a token ring network, however, other types of LANs may be utilized. Secure channels can be established among MKDCs 251, 253, 255 using various key exchange protocols for multi-party communication, as discussed below in connection with FIG. 4A, FIG. 4B, FIG. 4C, FIG. 4D.

FIG. 2C shows a distributed MKDC architecture that employs directory services to create secure channels among the MKDCs. In particular, the MKDC functionality is a part of a Proxy Service 269. The Proxy Service 269 enables directory principals, such as users, applications, and network devices, to store event types in the directory. These events are queued in specific event queues, in which subscribers (also called consumers) may register to receive such events. Proxy Service 269 has three principal functions, as shown in FIG. 2C: (1) providing Multicast Service in case Multicast Service is not available to a local node, (2) providing a Reliable Multicast Stack; and (3) providing discovery of Multicast Addresses, Topic Names, Channels, or Event Types that can be published or subscribed.

Proxy Service 269 includes a multicast service agent (MSA) 269b and may be distributed across LANs and WANs, including spanning directory domains, multicast routing and transport trees in an enterprise network. Distribution may be at all levels, such as within a domain, among domains, within or among trees, etc.

The term "event service node" is also used in this document to refer broadly to MSAs, MKDCs, and GCs. These elements may be integrated within a KDC or CA or MSA, or can be implemented as separate logical elements that communicate with an MSA. Separately or collectively, these elements form an event service node.

As an example, FIG. 2C illustrates interaction between one MSA with various entities within one domain 261. Domain 261 has at least one directory system agent (DSA) 263 and an associated KDC 271. Also within domain 261 are a publisher 265 and two subscribers 267. DSA 263, in one implementation, is a database in which information is stored in accordance with the X.500 information model or the LDAP information model. Information is exchanged with other DSAs using the Directory System Protocol (DSP). Such information may be stored as entries to an object class, in which the actual information in an entry are called "attributes." The object class defines the types of attributes an entry may possess. Subscribers 267 can access the directory through a Directory User Agent (DUA).

Publisher 265 and subscribers 267 communicate with Proxy Service 269, including MKDC 269a and MSA 269b, to authenticate themselves, to discover what events they can publish or subscribe, respectively, and to obtain a group session key. FIG. 2C illustrates Proxy Service 269 outside domain 261, however, it may also be located within the domain. To authenticate publisher 265 and subscribers 267, MKDC 269a, a group controller, and MSA 269b utilize DSA 263, a CA and KDC 271. The publisher 265, subscribers 267, MKDC 269a, and MSA 269b are security principals with respect to DSA 263. That is, publisher 265, subscribers 267, MKDC 269a, and MSA 269b can sign into the system by supplying their credentials. The MKDC 269a creates a group session key that is specific to a publisher. As a result, when the information is replicated across the network or enterprise, local copies of the directory can be used to obtain a common group session key. It cannot support dynamic groups, however, the MKDCs are trusted nodes that do not often fail and restart; accordingly, the DSA can be used to send a group session key.

To ensure continued secured communication, changing the group session keys periodically among the MKDCs is desirable. MSA 269b, which is specific to publisher 265, generates a number of keys sufficient to enable it to cycle through numerous group session keys to prevent an unauthorized user from intercepting and using these keys. Such keys may be selected among MKDCs based on providing their date and timestamp to an algorithm that generates a key version value.

As an example, FIG. 2C shows one domain 261 that is served by Proxy Service 269. However, in a complex enterprise network, MKDCs may span thousands of domains, posing difficulty in directory replication. One approach is to have subscribers, which may reside in any number of domains different from a publisher, request group membership from the KDC in the publisher's domain. Further, in practice a directory may have or cover any number of domains. In a directory with multiple domains, each domain has a KDC and a DSA.

Control of membership joins is addressed in the system. Simultaneous requests to join require some method of arbitration to prioritize the multiple requests. One approach is to require a random wait period after a first request attempt, for example, using an exponential back-off mechanism. In the alternative, priority can be granted based upon a Time-To-Live (TTL) parameter that is conveyed in a field in an IP frame. The TTL parameter is used in the ring beacon protocol for priority determination. This protocol permits initially only neighboring nodes nearest the multicast group to join, and thereafter allows more distant nodes to become members of the multicast group. The TTL field is a numeric field in which a large value corresponds to a node that is far away from the multicast group. Effectively, the TTL field limits the radius of hops ("search ring") of the multicast packet. In the context of membership joins, preference is given to close new users before potential members who are more remote.

Under this expanding ring beacon protocol, when a new node joins the multicast group, the new node listens for a "beacon" from a neighboring node until it times out. Before timing out, if a beacon is detected, the new node is admitted to the multicast group. The beacon contains an ordinal list of members of a group, which is identified by a value that may comprise a hashed value of all the members' IP addresses. If a new node times out, it starts a group by itself, identified by a hashed value of its IP address, and expands the search ring by increasing its TTL value.

Figure 3:
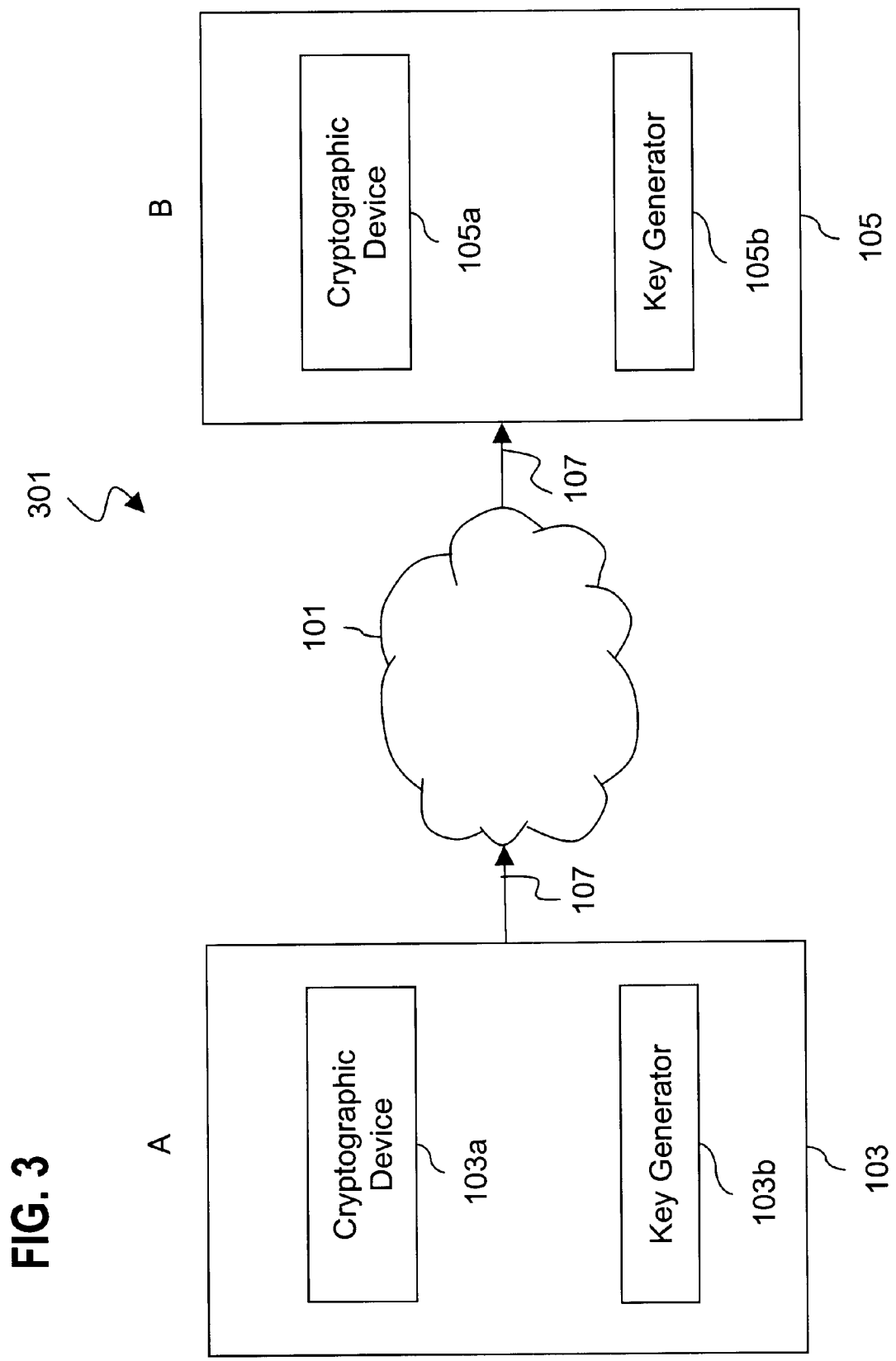
FIG. 3 is a block diagram illustrating the security mechanisms for providing secure communication between two participants in the system of FIG. 1.

FIG. 3 illustrates a secured communication system 301 that provides a secure channel between two participants. User A employing workstation 103 communicates with another workstation 105 of user B over a link 107. Link 107 is established over network 101, which includes, but is not limited to, a LAN, a WAN, the global packet-switched network known as the Internet, a wireless transmission medium, or any other medium for exchanging information between the participants. In addition, link 107 may be non-secure, thereby allowing third party access to information transmitted by the link 107, or alternatively, link 107 may be secure.

Workstations 103, 105 have components with complementary functions. Workstation 103 of user A includes a key generator 103b and a cryptographic device 103a. Key generator 103b generates public and private keys used for encrypting and decrypting information exchanged with workstation 105 of user B. Cryptographic device 103a encrypts and decrypts information exchanged with workstation 105 using private and public keys generated by key generator 103b. Similarly, workstation 105 includes a key generator 105b and a cryptographic device 105a. Key generator 105b supplies public and private keys that are used to establish a secured link 107 with workstation 103. Information exchanged with workstation 103 is encrypted and decrypted by cryptographic device 105a using private and public keys generated by key generator 105b.

Participants 103, 105 can utilize various key exchange protocols, such as the Diffie-Hellman method or the method discussed below, to exchange their keys. As a result, participants 103, 105 can securely exchange information over link 107 using a public key exchange protocol such that an eavesdropper having access to ciphertext transmitted on link 107 cannot feasibly decrypt the encrypted information.

A known public key exchange method is the Diffie-Hellman method described in U.S. Pat. No. 4,200,770. The Diffie-Hellman method relies on the difficulty associated with calculating discrete logarithms in a finite field. According to this method, two participants, A and B, each select random large numbers a and b, which are kept secret. A and B also agree publicly upon a base number p and a large prime number q, such that p is primitive mod q. A and B exchange the values of p and q over a non-secure channel or publish them in a database that both can access. Then A and B each privately computes public keys A and B, respectively, as follows:

$$A \text{ privately computes a public key } A \text{ as: } A = p^a \mod (q) \qquad (1)$$

$$B \text{ privately computes a public key } B \text{ as: } B = p^b \mod (q) \qquad (2)$$

A and B then exchange or publish their respective public keys A and B and determine private keys $k_a$ and $k_b$ as follows:

$$A \text{ computes a private key } k_a \text{ as: } k_a = B^a \mod (q) \qquad (3)$$

$$B \text{ computes a private key } k_b \text{ as: } k_b = A^b \mod (q) \qquad (4)$$

As evident from equation (3), A's private key is a function of its own private random number, a, and the public key, B. As it turns out, A and B arrive at the shared secret key based upon:

$k_a = B^a \mod (q)$ and $k_b = (p^{ab} \mod (q)$

Substituting for A and B using equations (1) and (2) above yields:

$k_a = (p^b \mod (q))^a \mod (q)$ and $k_b = (p^a \mod (q))^b \mod (q)$
$k_a = p^{ba} \mod (q)$ and $k_b = p^{ab} \mod (q)$ Therefore, $k_a = k_b$.

Using the Diffie-Hellman protocol, A and B each possesses the same secure key $k_a$, $k_b$, which can then be used to encrypt messages to each other. An eavesdropper who intercepts an encrypted message can recover it only by knowing the private values, a or b, or by solving an extremely difficult discrete logarithm to yield a or b. Thus, the Diffie-Hellman protocol provides a relatively secure approach.

Other approaches for key exchange that are suitable for use in embodiments of the present invention are disclosed in co-pending application Ser. No. NUMBER1, filed on the same date as this application, and naming as inventor Sunil K. Srivastava, and entitled "OPERATIONAL OPTIMIZATION OF A SHARED SECRET DIFFIE-HELLMAN KEY EXCHANGE AMONG BROADCAST OR MULTICAST GROUPS," the entire disclosure of which is hereby incorporated by reference as if fully set forth herein, and in co-pending application Ser. No. NUMBER2, filed on the same date as this application, and naming as inventor Sunil K. Srivastava, and entitled "PROCESSING METHOD FOR KEY EXCHANGE AMONG BROADCAST OR MULTICAST GROUPS THAT PROVIDES A MORE EFFICIENT SUBSTITUTE FOR DIFFIE-HELLMAN KEY EXCHANGE," the entire disclosure of which is hereby incorporated by reference as if fully set forth herein.

FIG. 4A shows a broadcast version of the Diffie-Hellman method involving three users A, B, C. Initially, each of the participants A, B, C randomly generates private integers, a, b, and c, respectively. Thereafter, they compute their public keys, as in step 402. These public keys are computed as follows:

$$A = p^a \mod (q) \qquad (5)$$

$$B = p^b \mod (q) \qquad (6)$$

$$C = p^c \mod (q) \qquad (7).$$

Next, in step 404, user A sends message $C' = C^a \mod (q)$ to user B. In turn, B transmits the message, $A' = A^b \mod (q)$ to C, as shown by step 406.

In step 408, user C sends A the message $B' = B^c \mod (q)$. As shown in step 410, the users are then able to arrive at a shared secret key, k, by computing:

$$A \text{ computes } k: k = B'^a \mod (q) = p^{abc} \mod (q) \qquad (8)$$

$$B \text{ computes } k: k = C'^b \mod (q) = p^{abc} \mod (q) \qquad (9)$$

$$C \text{ computes } k: k = A'^c \mod (q) = p^{abc} \mod (q) \qquad (10)$$

The method establishes a secure communication channel among users A, B, and C. Although three users are discussed in the above example, the Diffie-Hellman key-exchange method applies to any number of users.

Figure 4B:
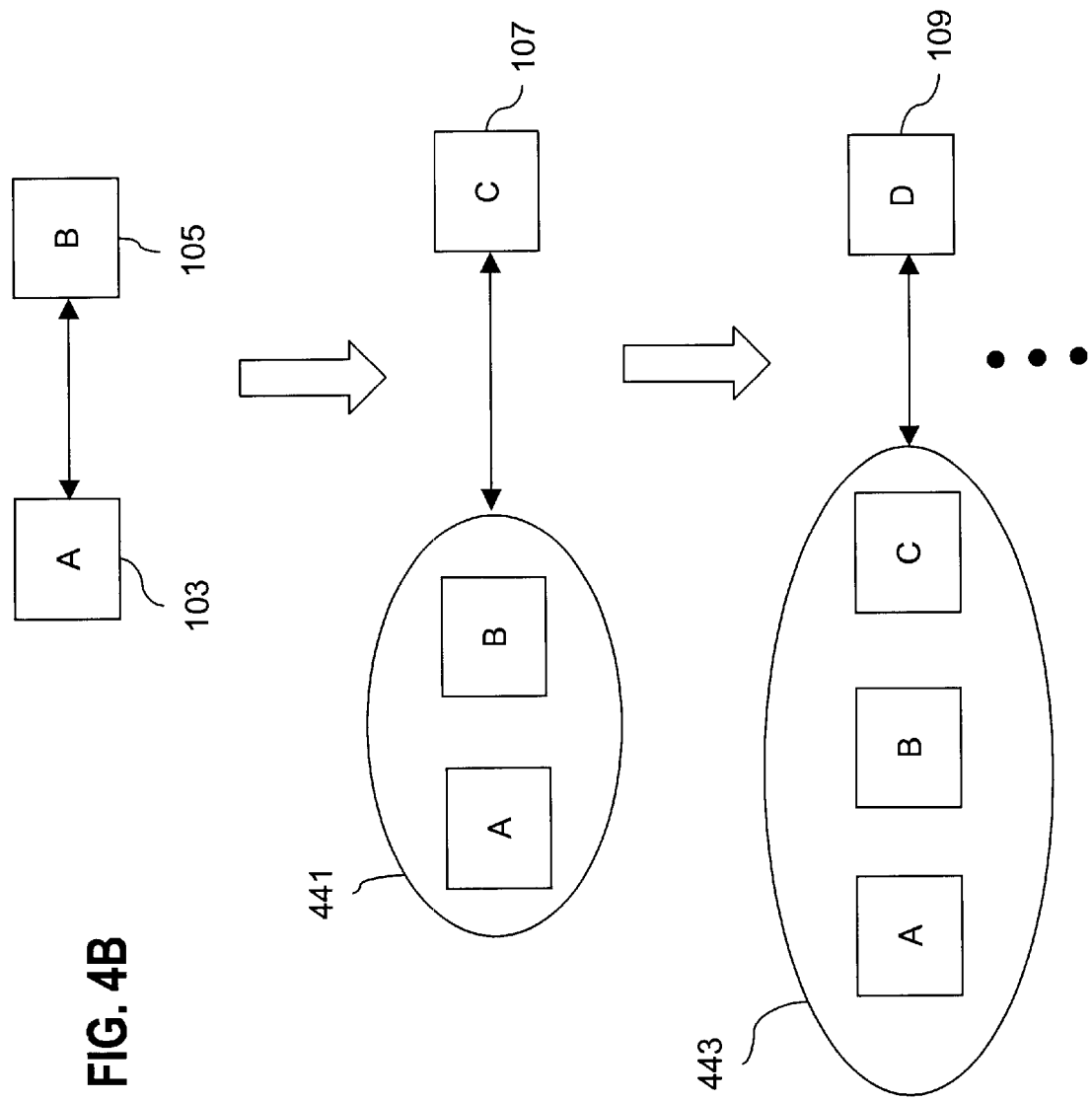

FIG. 4B shows another public key exchange protocol that is based mathematically on the Diffie-Hellman method and that addresses multicast group membership two entities at a time. An entity may comprise one or more nodes. In this example, a multicast group comprises users A, B, C, D of the network of FIG. 1. Initially, assume that users A, B use workstations 103, 105 to establish a common shared key to securely communicate between themselves. Conceptually, users A, B form a single entity 441 and a subsequent user or node seeking to join the multicast group effectively views the previously formed multicast group as a single unit. Hence, users A, B are treated as one entity with respect to arriving at a new shared secret key with a new group member. Only one user, A or B, needs to communicate with the new multicast group member, user C. In the preferred embodiment, the user who last joins the multicast group is designated as the node that relays the group's information to the new user.

The current multicast group or entity 441 has two users A, B. B is the designated node, because B can be considered as having joined with A. Alternatively, the designated node can be determined according to physical proximity to the new node, or other metrics such as telecommunication cost, reliability, link utilization, etc. Once entity 441 and user C arrive at a new shared secret key, they form a new entity 443, constituting a new multicast group that subsumes multicast group 441.

If user D wishes to join the multicast group, only one of the users among A, B, C needs to share the group's public value with user D. Because user C was the last member to join, it forwards the group's public value to user D, who may then compute the shared secret key. The foregoing binary approach of determining a shared secret key between two entities at a time, as further described with respect to FIG. 4C and FIG. 4D, results in a greatly reduced number of messages exchanged among the group members over the standard broadcast Diffie-Hellman approach.

Figure 4C:
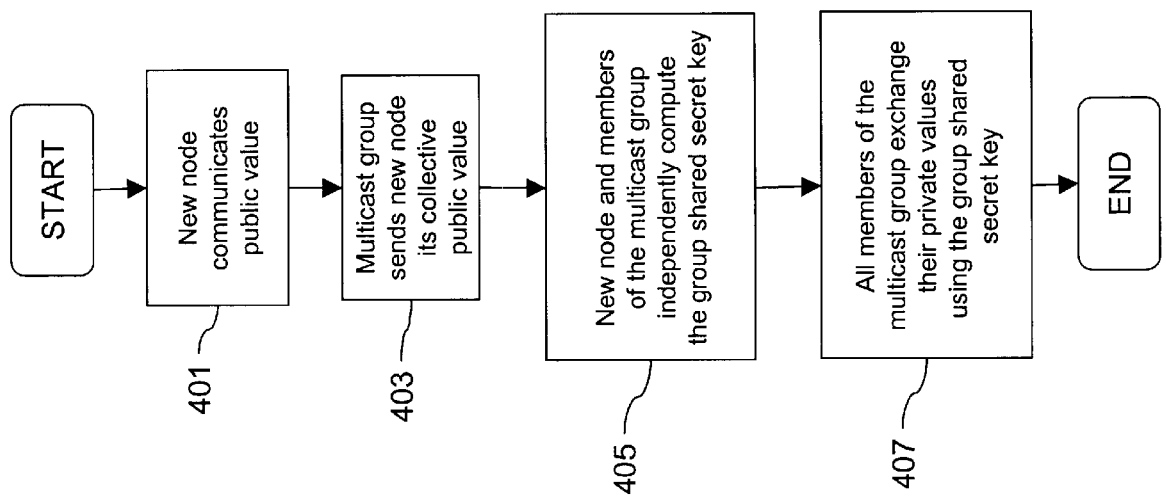

FIG. 4C is a flow diagram showing a method of carrying out the binary approach. The method assumes that a multicast group of one or more nodes or users is in existence. If two or more nodes make up the multicast group, the method further assumes that the group is communicating over a secure channel such that each member of the multicast group possesses or has knowledge of the group shared secret key.

In step 401, a new node that wishes to join the existing multicast group communicates the new node's public value to the multicast group. In an exemplary embodiment, step 401 is carried out by a directory that stores the public value for ready access by the members of the multicast group.

In step 403, the multicast group sends the new node the collective public value of the multicast group. The computation of this public value is more fully discussed below with respect to FIG. 4D. Based upon each other's public key, the new node and the multicast group members independently compute a new group shared secret key, as shown by step 405. With this new group shared secret key, all members of the new multicast group can exchange their private values, as shown by step 407. Accordingly, secure communication can be achieved.

FIG. 4D is a flow diagram of the foregoing process in greater detail. FIG. 4D shows a key exchange protocol to arrive at a shared secret key in a context involving four nodes or users A, B, C, D. In step 411, A and B compute a shared secret key, $k=p^{ab} \bmod (q)$, thereby forming entity 441 in a manner similar to the standard two party Diffie-Hellman method. A and B each publishes its respective public key ($A=p^a \bmod (q)$ and $B=p^b \bmod (q)$). User A obtains B's public key to compute $B^a \bmod (q)$, which equals $p^{ab} \bmod (q)$; user B performs a similar computation based on A's public key.

Once A and B have reached a shared secret key, they exchange their private numbers, a and b. Numbers a and b are randomly generated integers and are embedded in messages that are sent by users A and B to each other. These messages can be signed by the sending node using a private key that differs from the sending node's private number. In one embodiment, the private key may be a permanent private key. By using separate private keys, the multicast group obtains an additional level of security.

Assume that currently, the multicast group includes users A and B; however, user C has a message to send to both A and B. As a result C seeks to join the multicast group. In step 413, user C communicates its public value, $C=p^c \bmod (q)$, to the other users, A and B, within the established multicast group. Next, as shown in step 415, a public key value, AB, determined by users A and B, is sent to user C by either A or B.

$$AB = k_{ab}{}^{ab} \bmod (q) = p^{(ab)(ab)} \bmod (q) \quad (11)$$

According to Equation (11), the private number of the formed entity or multicast group, AB, is the product of the individual private numbers a and b, raised to a power that is a function of the number of nodes within the formed entity. Thus, the private value of AB is $(ab)^2$.

In the preferred embodiment, the last member to join the group has responsibility of transferring the collective public key value to a "joining" node. Thus, user B transmits public key AB to C. At the time of joining the multicast group, new member C has knowledge of only one entity, which may be one or more nodes; in this example, A and B form one entity. A and B independently compute the shared secret in step 417, using Equation 12:

$$k_{abc} = C^{(ab)(ab)} \bmod (q) = p^{(ab)(ab)} \bmod (q) = p^{(ab^{**}2)c} \bmod (q) \quad (12)$$

A and B are able to compute the shared secret key because they know each other's randomly generated private numbers a and b. This computation, operationally, can be accomplished by tracking the number of times each of the nodes has undergone multicast membership joins. In this instance, A and B have been involved with multicast joins twice, while user C has done so only once.

User C computes the group shared secret key as follows:

$$k_{abc} = (AB)^c \bmod (q) = p^{(ab)(ab)c} \bmod (q) = p^{(ab^{**}2)c} \bmod (q) \quad (13)$$

Now that a group shared secret key has been computed by all the members of the "new" multicast group, the members exchange their private values to begin communicating over a secure channel, as shown in step 419.

Assume that another user D now wants to communicate with all the users of the multicast group. User D communicates its public value, D ($=p^d \bmod (q)$) to the multicast group, as shown by step 421. In step 423, the multicast group transfers an agreed upon collective public value, ABC, to D. According to one embodiment, C is designated as the member to convey value, ABC, to user D, and the value ABC is:

$$ABC = k_{abc}{}^{abc} \bmod (q) = p^{((ab)(ab)c)(abc)} \bmod (q) = p^{(ab^{}3)c^{}2)} \bmod q \quad (14)$$

Based on Equation (14), the private value for the multicast group is $(ab)^3(c^2)$. Thus, the multicast group private value is the product of the private values of the nodes raised to the number of times each node has been in group formations. This is advantageous because the collective public key can be derived by having each node track the number of times it has participated in multicast group formation. With this information, in step 425 the user D, as the new node, can compute a new group shared secret key, $k_{abcd}$:

$$k_{abcd} = (ABC)^d \bmod (q) = p^{(((ab)(ab)c)))(abc)d} \bmod (q) = p^{(ab3)(c2)d} \bmod (q) \quad (15)$$

Likewise, the other members A, B, C of the multicast group calculate the new group shared secret key.

In the preferred embodiment, the processes shown in FIG. 4A, FIG. 4B, FIG. 4C, FIG. 4D may be implemented as one or more computer-executed instructions, processes, programs, subroutines, functions, or their equivalents. In an embodiment, each workstation 103, 105, 107, 109 is a general-purpose computer of the type shown in FIG. 8 and described herein in connection with FIG. 4A, FIG. 4B, FIG. 4C, FIG. 4D. The cryptographic devices 103a, 105a and the key generators 103b, 105b are one or more computer-executed instructions, processes, programs, subroutines, functions, or their equivalents. Further, embodiments may be implemented as discrete hardware circuitry, a plurality of computer instructions (computer software), or a combination of discrete hardware circuitry and computer instructions.

Once a distributed group controller or MKDC of FIG. 2A, FIG. 2B, FIG. 2C has established secure communication using any one of the key exchange methods, the distributed group controller may efficiently disseminate and maintain the group session keys for the members of the multicast group of users A–H. According to the present invention, a tree structure is used. In the tree structure, the MKDC can be implemented as a group controller that is joined with other MKDCs in the tree to enable communication of keys among them. This arrangement enables secure communications between the MKDCs.

Figure 5:
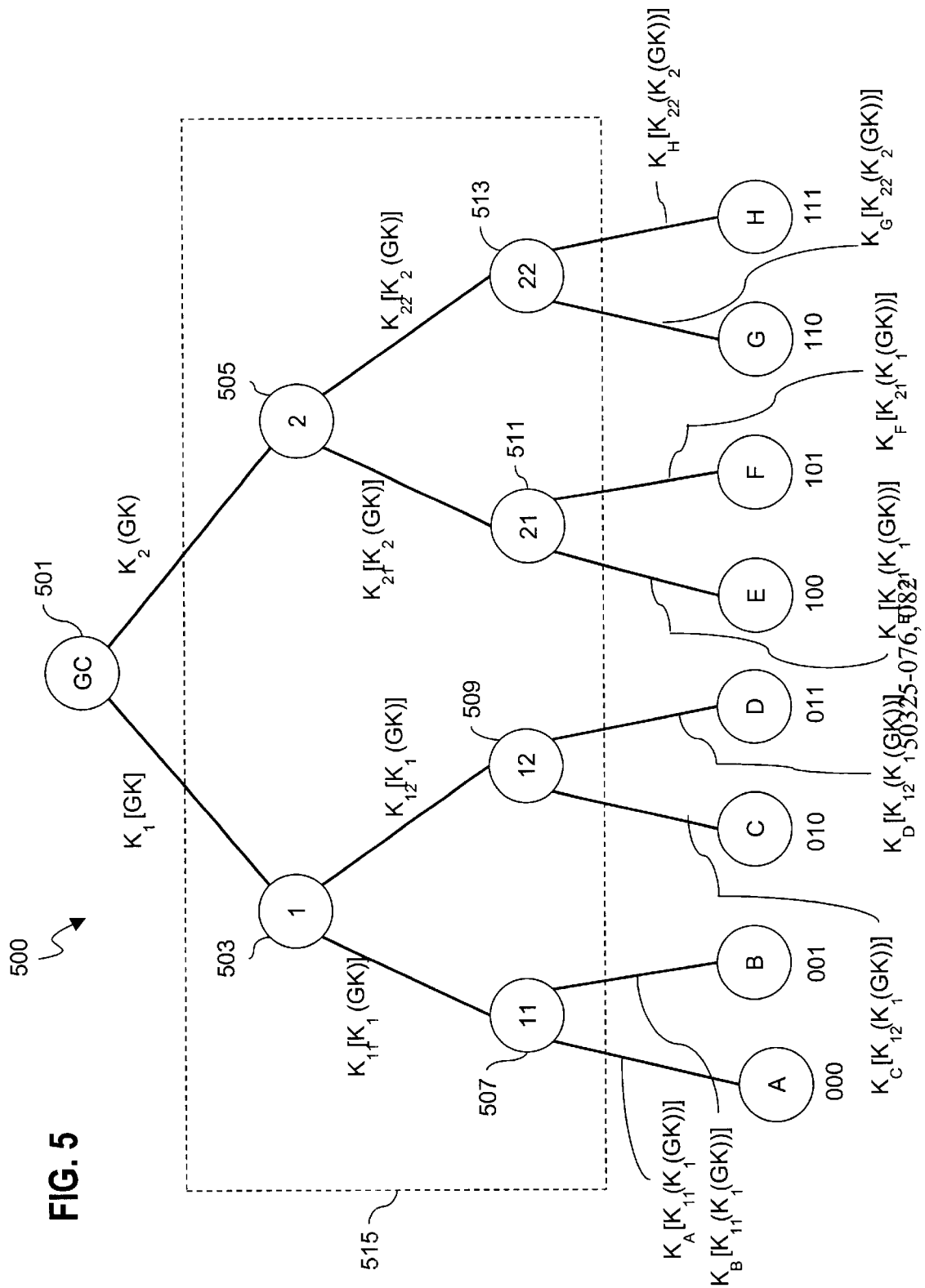
FIG. 5 is a diagram of a binary tree approach to key management used in the systems of FIG. 2A, FIG. 2B, and FIG. 2C.

FIG. 5 shows a binary tree structure for key management among a multicast group. In the binary tree approach, users, clients or nodes of a multicast group are mapped to leaf nodes of a binary tree 500. Root node 501 represents the distributed group controller. In one embodiment, leaf nodes are associated with users A–H. Each leaf node forms a point-to-point secure channel with group controller 501. Thus, intermediate nodes 515 are not true nodes and are not associated with software or hardware elements of a network, but rather serve to conceptually illustrate how each leaf obtains the group session key (GK).

Group controller node 501 has the responsibility of encrypting $2\log_2 N+1$ keys and sending the keys to nodes A–H via a multicast message. The actual messages that are transmitted by group controller 501 contain, for example, information about the key's identification, revision, and version. Alternatively, group controller node 501 may send $2\log_2 N+1$ messages to each group member individually. Each leaf node A–H stores $\log_2 N$ keys, in which one of the keys is the particular node's private key and the remaining keys are shared among some of the other nodes.

Labels along the branches of binary tree 500 show how the group key GK is encoded for each member of the multicast group. The group key undergoes successive encryption by the private keys of nodes of all branches.

For example, for the branch comprising nodes 501, 503, 507 and user A, group key GK is first encrypted using the private key, $K_{11}$, of node 503. These keys are then encrypted using the private key, $K_{11}$, of node 507. The private key of user A encrypts these keys. Thus, group controller 501 sends, to user A, the last encrypted message, $K_A[K_{11}(K_1(GK))]$. When user A receives this encrypted message, it decrypts using its private key and utilizes the corresponding shared keys until the group key is determined. Under this arrangement, no one leaf has knowledge of all the shared keys, thereby providing an extra level of security.

In another embodiment, intermediate nodes 515 of the binary tree 500 represent actual multicast group members. This arrangement more naturally accommodates superimposition of multicast routing trees, reliable multicasting transport trees, hierarchical cache chaining structures, and directory trees. Using intermediate nodes 515, the number of group members and keys is $2^{N+3}1$ 1, and each group member stores $\log_2 n$ keys, where n defines the level in a tree, ranging from 0 to N, and N is the number of nodes in the tree. In contrast, an embodiment that employs only leaves of the binary tree 500 accommodates N nodes and $2^{N+1}-1$ total keys, in which each node has $\log_2 N$ keys.

Under this scheme, there is flexibility in implementation with regard to joining and leaving the multicast group. The number of keys affected is essentially $2\log_2 N - 2\log_2 n$. In the first option, the intermediate node, for example node 503, behaves as a group controller for its branch by changing the keys of the affected nodes within its branch. This first option reduces the workload on the group controller 501. As a second option, the intermediate node 503 requests a new session key from the group controller 501 or requests permission to create a new session key.

In the case where the group controller 501 creates a new group session key, the group controller 501 encrypts the new session key with the private key of the intermediate node 503. However, if the group session key results from a member leaving the multicast group, the intermediate node 503 changes its key(s) since such keys were known by the leaving node. To do so, the intermediate node has a separate secured private channel with the group controller 501. Using this private channel, the intermediate node sends the group controller 501 its updated keys. Alternatively, the intermediate node (which is acting as a sub-group controller) decrypts the group session key from the group controller 501 and then encrypts the group session key with the newly created keys associated with the affected nodes.

In yet another embodiment of the binary tree method, the private keys of the nodes can be made to correspond to an address identification. Assuming that there is an address space of $2^N$ member nodes, each member is identified by a word of N bits in length. For example, users A–H are assigned 000-111, respectively. Further, each bit in the address ID can be considered to correspond to a private key, and the total number of keys is 2N.

In an exemplary embodiment, address IDs can be hierarchically assigned, in which the most significant bits (MSBs) represent node members closer to the root node and group controller. When a node joins the multicast group, group controller 501 distributes N keys, corresponding to bit values of the joining node, by embedding these keys in the address identifier of the new node after version incrementing it. In the case where the node leaves the group, the group controller 501 communicates a new group session key encrypted in the remaining N keys that were unaffected by the node leaving. The group controller 501 also broadcasts the new version of the affected N keys encrypted in the new group key and the old set of N keys.

IP address and time coordinates of a directory node may be used to derive a unique address identifier for a node that is joining a multicast group. However, this does not result in a contiguous sequence or address space of the identifiers. To obtain identifiers that are within a contiguous address space, the identifiers may be issued by a central registration authority or appropriately hashed. Directory replication can be utilized to implement a distributed MKDC, as shown in FIG. 2B and FIG. 2C. According to a preferred embodiment, an X.500 directory or LDAP directory operates as a mechanism for key distribution and provides a logical infrastructure for the tree approach described above. When the directory is replicated, an MKDC can obtain a common group session key from a local copy of the directory.

Figure 6A:
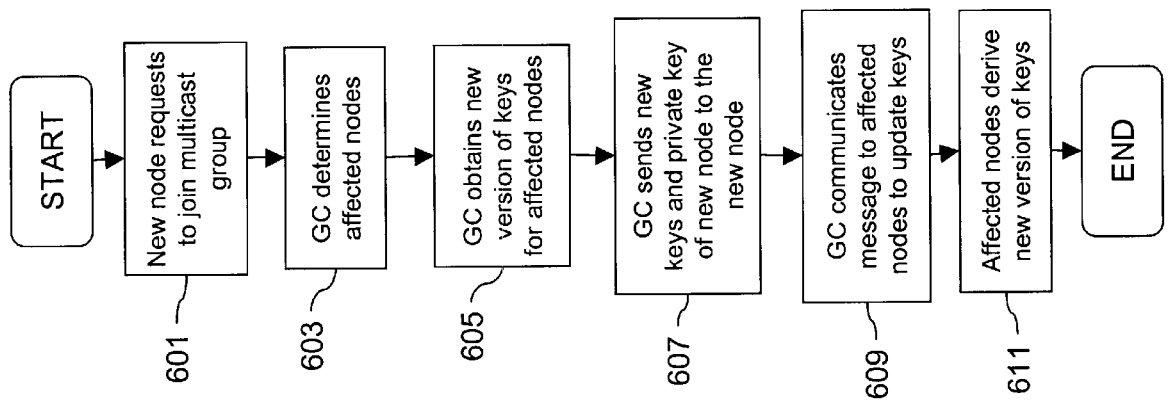
FIG. 6A and FIG. 6B are a flow chart and a diagram, respectively, of an exemplary embodiment of the operation of the group controller of FIG. 2A, FIG. 2B, FIG. 2C related to joining of multicast group.

FIG. 6A is a flow chart that shows a process of a node joining a multicast group according to the binary tree algorithm of FIG. 5. In relation to FIG. 5, joining the multicast group means assuming a leaf position on the binary tree 500 or creating and storing a new node at the level of leaf nodes A–H. Because the shared keys along a branch with the new leaf are required to be updated, those nodes along this particular branch are affected by the addition.

As shown by step 601, a node that desires to be a part of the multicast group first sends a request to the group controller 501. The group controller 501 determines which nodes are affected by this join, as shown by step 603. The group controller 501 generates new versions of the keys of the affected nodes, as shown by step 605.

In step 607, group controller 501 sends these new versions of the shared keys and a unique private key to the new node. In step 609 the group controller 501 transmits a message to the affected nodes, instructing the nodes to update their keys by changing the revision numbers. Each of the affected nodes, in response to the message, derives a new version of its keys, as shown by step 611. In the preferred embodiment, each affected node performs a one way hash to compute the new version of the keys. Such an approach permits the generation of unique keys to be synchronized between the member nodes and the group controller without having to transmit the actual keys, thereby reducing the probability of security leaks.

Figure 6B:
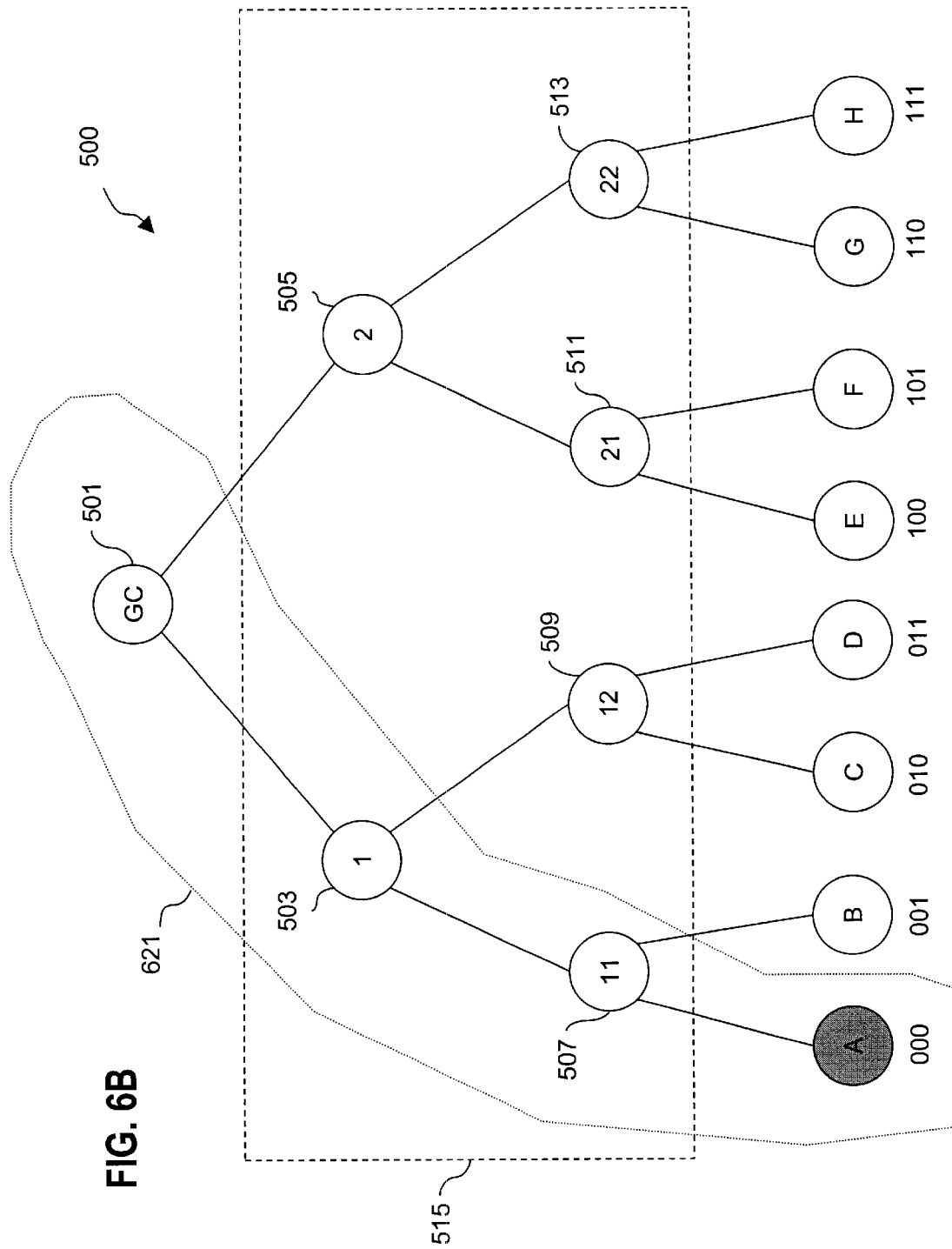

FIG. 6B provides an exemplary illustration of a user joining the multicast group. In this example, user A, who seeks to join, sends a request message to group controller node 501 over an unsecured channel. Because user A belongs in the left branch 621 of the binary tree 500, the affected nodes in this instance are nodes 503, 507. These nodes are required to update their keys by performing a one way hash function on the current version of their keys when instructed by group controller 501. The group controller 501 transmits the shared keys of the nodes along branch 621 to user A along with user A's private key. Thus, user A is able to derive the group session key and securely communicate with the other members of the multicast group. The group controller 501 is also responsible for managing the keys when a node leaves the multicast group.

Figure 7A:
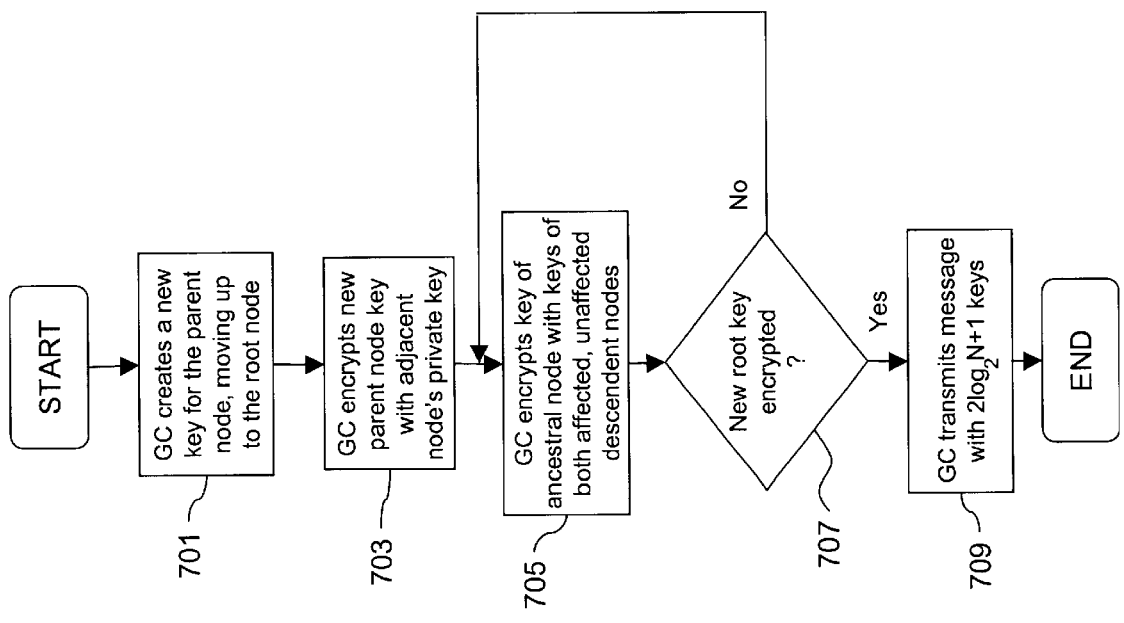
FIG. 7A and FIG. 7B are a flow chart and a diagram, respectively, of an exemplary embodiment of the operation of a group controller of FIG. 2A, FIG. 2B, FIG. 2C related to leaving the multicast group.

FIG. 7A is a flow chart that shows a process of managing keys within the multicast group when a group member leaves. In this case, all the keys known to the "leaving" node are version controlled to prevent such user from intercepting future messages exchanged among the multicast group.

Accordingly, in step 701, group controller 501 generates a new key for the parent of the leaving node as well as all ancestral nodes until the root node is reached. The group controller 501 also creates new keys for the sub-branches hanging off from the sub-nodes that fall on the path from the departed node to the root node. In particular, the group controller 501 encrypts a new key of the parent node with the adjacent node's private key, as shown by step 703.

The key of the immediate ancestral node (which in this instance is the grandparent of the leaving node) is encrypted with the keys of both affected and unaffected descendent nodes, as indicated by step 705. The group controller 501 then determines whether the new root key has been encrypted, as shown by step 707. If the root key 501 has not been encrypted, then step 705 is repeated until the root key 501 is encrypted with its two child nodes. In fact, once the root node 501 has been updated, all the keys are transferred to each of the users of the affected branch 720 in one message containing $2\log_2 N+1$ keys.

Figure 7B:
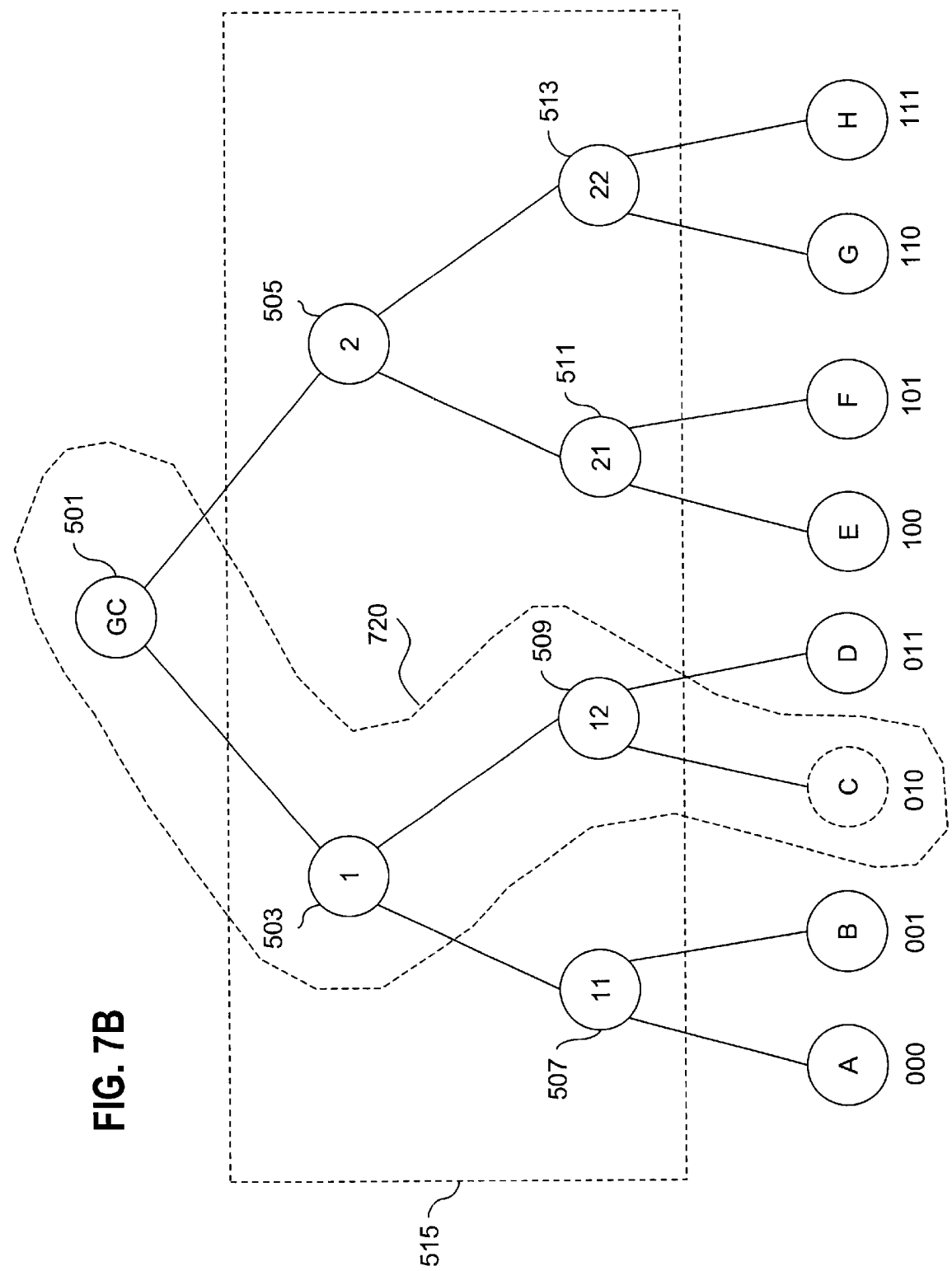

FIG. 7B is a diagram that illustrates the process of FIG. 7A in an example case in which user C terminates its membership in the multicast group. As described above, group controller 501 creates a new key for each ancestral node along the path 720 of the leaving node; i.e., node 509 of user C, a new key for the grandparent node 503, and a new group session key.

Accordingly, a directory may be used as infrastructure to build secure communications among a plurality of MKDCs. Each address has two keys for each bit in the address value. If the value of a particular bit is 1, then the first key is used, otherwise the second key is used. All nodes have overlapping keys and no single node has all keys. An administrator can determine a group session key, update one directory domain with the group session key, and directory replication then causes the keys to be replicated. As a result, keys become locally available to all nodes that need them.

Figure 8:
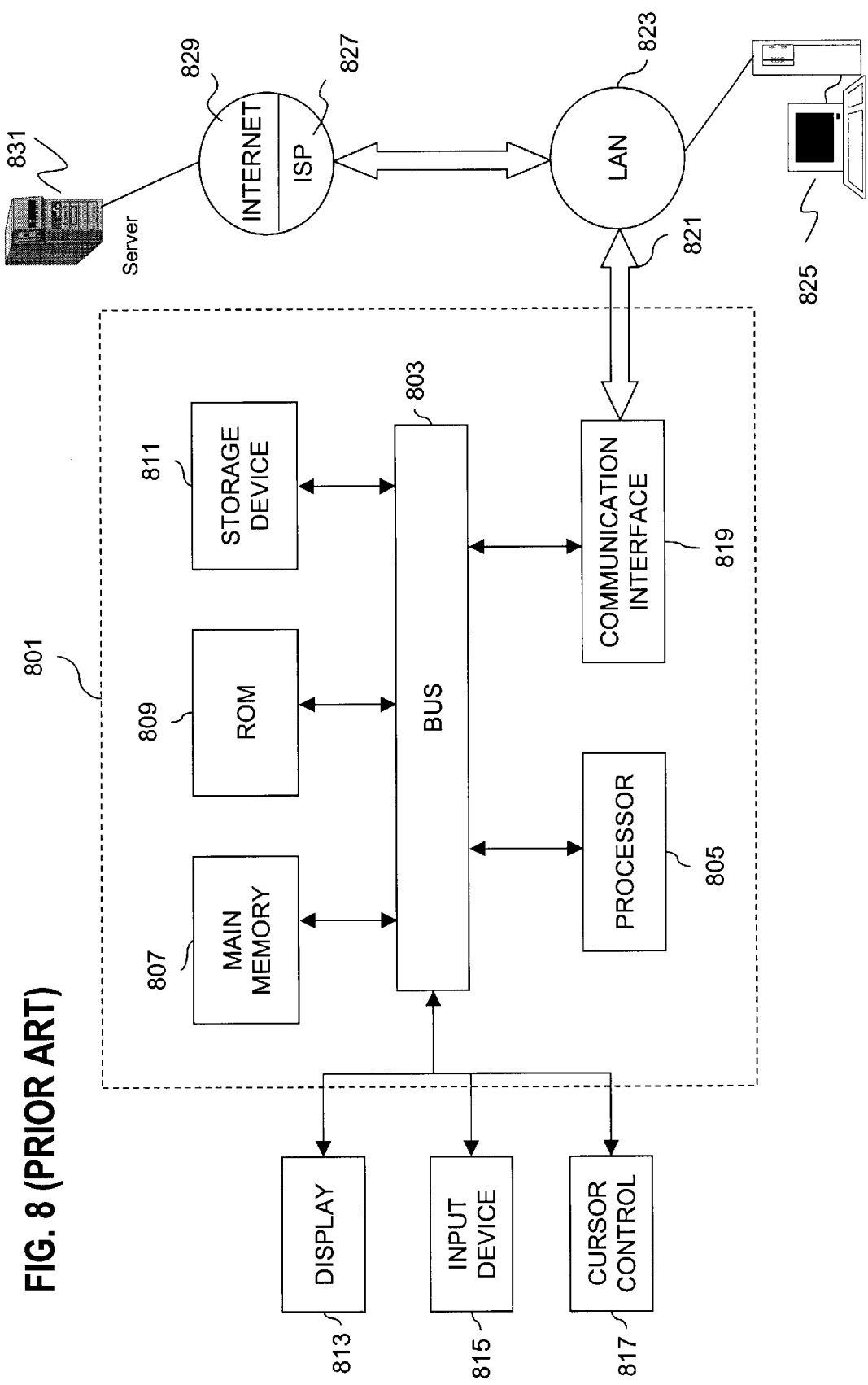
FIG. 8 is a block diagram of a computer system on which embodiments of the group controller of FIG. 2A, FIG. 2B, FIG. 2C may be implemented.
Figure 9:
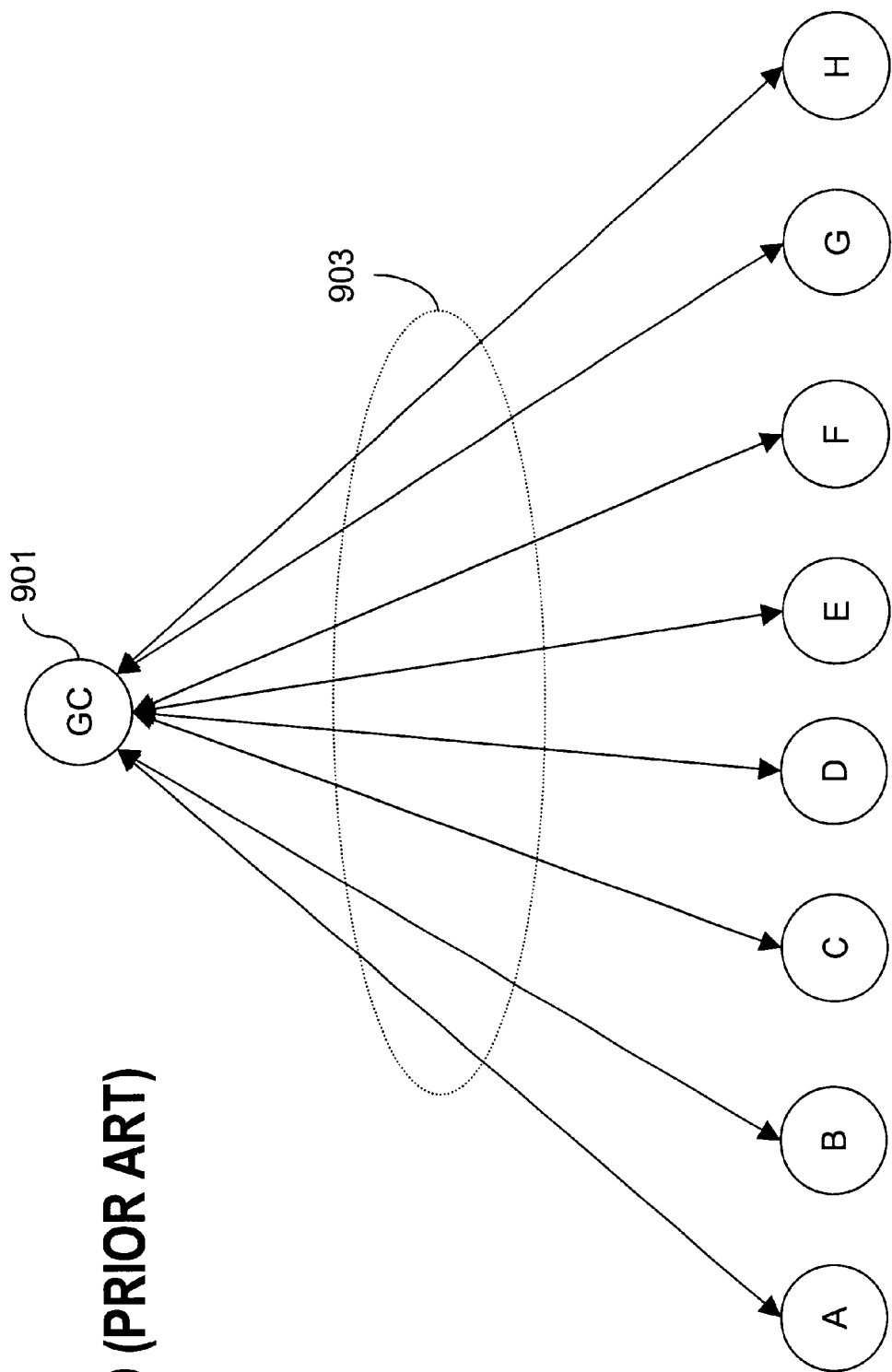
FIG. 9 is a diagram of a conventional secure communication system using a single centralized group controller.

FIG. 8 illustrates a computer system 801 upon which an embodiment may be implemented. Such a computer system 801 may be configured as a user node or server node to provide the various security and directory services as earlier discussed. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device, coupled to bus 803 for storing information and instructions to be executed by processor 805. In addition, main memory 807 may be used for storing temporary variables or other intermediate information during execution of instructions to be executed by processor 805. Notably, the values associated with tracking the number of times a node engages in multicast group formation may be stored in main memory 807. Computer system 801 further includes a read only memory (ROM) 809 or other static storage device coupled to bus 803 for storing static information and instructions for processor 805. A storage device 811, such as a magnetic disk or optical disk, is provided and coupled to bus 803 for storing information and instructions. With respect to the system of FIGS. 2A–2C, information on the binary tree structure can be stored in device 811 for manipulation by processor 805.

Computer system 801 may be coupled via bus 803 to a display 813, such as a cathode ray tube (CRT), for displaying information to a computer user. An input device 815, including alphanumeric and other keys, is coupled to bus 803 for communicating information and command selections to processor 805. Another type of user input device is cursor control 817, such as a mouse, a trackball, or cursor direction keys for communicating direction information and command selections to processor 805 and for controlling cursor movement on display 813.

Embodiments are related to the use of computer system 801 to implement a public key exchange encryption approach for securely exchanging data between participants. According to one embodiment, the public key exchange encryption approach is provided by computer system 801 in response to processor 805 executing one or more sequences of one or more instructions contained in main memory 807. Such instructions may be read into main memory 807 from another computer-readable medium, such as storage device 811. Execution of the sequences of instructions contained in main memory 807 causes processor 805 to perform the process steps described herein. One or more processors in a multiprocessing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 805 for execution. Such a medium may take many forms, including but not limited to, non-volatile media, volatile media, and transmission media. Non-volatile media includes, for example, optical or magnetic disks, such as storage device 811. Volatile media includes dynamic memory, such as main memory 807. Transmission media includes coaxial cables, copper wire and fiber optics, including the wires that comprise bus 803. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk of a remote computer. The remote computer can load the instructions relating to computation of the shared secret key into its dynamic memory and send the instructions over a telephone line using a modem. A modem local to computer system 801 can receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network 823. For example, communication interface 819 may be a network interface card to attach to any packet switched LAN. As another example, communication interface 819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 819 sends and receives electrical, electromagnetic or optical signals that carry digital data streams representing various types of information.

Network link 821 typically provides data communication through one or more networks to other data devices. For example, network link 821 may provide a connection through local network 823 to a host computer 825 or to data equipment operated by an Internet Service Provider (ISP) 827. ISP 827 in turn provides data communication services through the Internet 829. Local network 823 and Internet 829 both use electrical, electromagnetic or optical signals that carry digital data streams. The signals through the various networks and the signals on network link 821 and through communication interface 819, which carry the digital data to and from computer system 801, are exemplary forms of carrier waves transporting the information.

Computer system 801 can send messages and receive data, including program code, through the network(s), network link 821 and communication interface 819. In the Internet example, a server 831 might transmit a requested code for an application program through Internet 829, ISP 827, local network 823 and communication interface 819. One such downloaded application provides a public key exchange encryption approach for securely exchanging data between participants as described herein.

The received code may be executed by processor 805 as it is received, and/or stored in storage device 811, or other non-volatile storage for later execution. In this manner, computer system 801 may obtain application code in the form of a carrier wave.

The techniques described herein provide several advantages over prior public key exchange encryption approaches for securely exchanging data among multiple participants using directory replication. By utilizing private keys that can serve as unique IDs, the keys can be stored efficiently. Further, the distributed group controllers exhibit improved system throughput and scalability.

As described in more detail herein, each DSA has a DRP component that can replicate objects and attributes for Security Principal Ids, Group Session Keys and Private Keys, Multicast Group Multicast Address, Topic Names, Event Types and Channels. They build a point to point secured channel using KDC or CA. Then using replicated keys and security principal Ids the system can create a secured channel of MKDC, MSAs, and GCs.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing addition of a first event service node to a secure multicast group that includes a plurality of other event service nodes in a communication network, wherein each of the event service nodes is capable of establishing multicast communication and serving as a key distribution center, wherein each event service node is created and stored within a domain of a directory server system, wherein each event service node is logically organized in a binary tree having a root node, intermediate nodes, and leaf nodes, wherein one of the event service nodes is a group controller and is represented by the root node, and wherein the other event service nodes are represented by the leaf nodes, the method comprising the steps of:

authenticating the first event service node with a subset of the event service nodes that are affected by an addition of the first event service node to the multicast group, based on key information stored in a directory;

receiving a plurality of private keys from the subset of nodes;

generating a new private key for the first event service node;

communicating the plurality of private keys and the new private key to the first event service node;

communicating a message to the subset of nodes that causes the subset of nodes to update their private keys.

2. A method as recited in claim 1, wherein authenticating the plurality of event service nodes based on information stored in a directory includes authenticating the plurality of event service nodes based on a directory that comprises a directory system agent (DSA) for communicating with one or more of the event service nodes and a replication service agent (RSA) for replicating attribute information of the one or more event service nodes.

3. A method as recited in claim 1, wherein authenticating the plurality of event service nodes based on information stored in a directory includes authenticating the plurality of event service nodes based on a directory that comprises a directory system agent (DSA) for communicating with one or more of the event service nodes and a replication service agent (RSA) for replicating attribute information of the one or more event service nodes, wherein the attribute information comprises a group session key and the private keys.

4. A method as recited in claim 1, wherein generating private keys comprises generating private keys for each of the intermediate nodes and leaf nodes, the private keys providing unique identification within the tree structure, and wherein each private key is N bits in length, wherein each bit corresponds to one of the private keys, and N is an integer.

5. A method as recited in claim 1, further comprising distributing a group session key to all nodes by creating and storing the group session key using a first event service node of one domain of the directory; replicating the directory; and obtaining the group session key from a local event service node that is a replica of the first event service node.

6. A method as recited in claim 1, wherein generating private keys comprises generating private keys for each of the intermediate nodes and leaf nodes, the private keys providing unique identification within the tree structure, and wherein each private key is N bits in length, wherein each bit corresponds to one of the private keys, and N is an integer; and wherein the most significant bits of the N bits correspond to nodes logically near the root node in the tree structure.

7. A method as recited in claim 1, further comprising selectively updating a group session key for use in encrypting communications among all nodes in the multicast group and selectively updating the private keys.

8. The method as recited in claim 7, further comprising selectively updating the group session key and the private keys by:

detecting whether a network node associated with one of the leaf nodes is leaving the secure multicast or broadcast group;

determining tree nodes along a tree path corresponding to the leaving leaf node are affected in response to the detecting step;

updating the private keys of the affected intermediate nodes;

generating a new group session key;

modifying the attribute information based upon the updated private keys and the new group session key; and generating instructions that distribute the modified attribute information using directory replication.

9. A method as recited in claim 8, wherein the step of generating the new group session key is performed by one of the affected intermediate nodes that is the parent node of the leaving leaf node, the one affected intermediate node selectively sending the new group session key to all ancestral nodes along the tree path.

10. A method as recited in claim 8, wherein the step of generating the new session key is performed by the group controller that is represented by the root node.

11. A method as recited in claim 8, wherein the step of updating the private keys of the intermediate nodes comprises performing a one way hash function on the private keys in response to receiving a corresponding instruction from the root node.

12. A method as recited in claim 1, further comprising selectively updating a group session key and the private keys, wherein the step of selectively updating comprises:

receiving a request message from a new network node to join the secure multicast group;

determining which of the intermediate nodes along a tree path corresponding to the new leaf node are affected in response to the receiving step;

updating the private keys of the affected intermediate nodes;

generating a new group session key and a private key of the new leaf node;

modifying the attribute information based upon the updated private keys, the new group session key, and the private key of the new leaf node; and distributing the modified attribute information using directory replication.

13. A method as recited in claim 12, wherein one of the affected intermediate nodes that is the parent node of the new leaf node requests permission from the root node to generate the new session key.

14. A method as recited in claim 12, wherein the step of generating the new session key is performed by the root node.

15. A method as recited in claim 12, wherein the step of updating the private keys of the intermediate nodes comprises performing a one way hash function on the private keys in response to receipt of a corresponding instruction from the root node.

16. A method as recited in claim 1, wherein generating the private keys comprises generating the private keys based upon an Internet Protocol (IP) address and time values.

17. A method as recited in claim 1, wherein generating the private keys comprising generating private keys that occupy a contiguous address space.

18. A method as recited in claim 17, wherein generating private keys that occupy a contiguous address space comprises generating private keys that occupy contiguous address spaces using a central registration authority.

19. A method as recited in claim 17, wherein generating private keys that occupy a contiguous address space comprises generating private keys by performing a hash function on the private keys.

20. A method for managing removal of a first event service node from a secure multicast group that comprises the first event service node and a plurality of event service nodes in a communication network, wherein each of the event service nodes is capable of secure multicast communication and capable of serving as a key distribution center, wherein each event service node is created and stored within a domain of a directory server system, wherein each event service node and the secure multicast group are logically represented by a binary tree having a root node, intermediate nodes, and leaf nodes, wherein one of the event service nodes is a group controller and is represented by the root node, and wherein the other event service nodes are represented by the leaf nodes, the method comprising the steps of:

(a) creating and storing a new authentication key for an event service node that is a logical parent node of the first event service node, and for each successive ancestral node up to the root node;

(b) encrypting the new authentication key for the logical parent node, using a private key of an adjacent node;

(c) encrypting an authentication key of an immediate ancestral node using the private keys of all node that are logically below the first event service node;

(d) iteratively repeating step (c) until an authentication key of the root node has been encrypted; and (e) communicating the authentication keys to each node in a branch of the tree that contains the first event service node.

21. A method as recited in claim 20, further comprising distributing a group session key to all nodes by creating and storing the group session key using a first event service node of one domain of the directory; replicating the directory; and obtaining the group session key from a local event service node that is a replica of the first event service node.

22. A method as recited in claim 20, wherein step (e) comprises the step of communicating the authentication keys to each node in a branch of the tree that contains the first event service node using one message containing $2\log_2 N+1$ keys.

23. A method as recited in claim 20, wherein step (a) includes the step of creating and storing a new group session key for use in secure multicast communications by all nodes in a branch of the tree that contains the first event service node.

24. A communication system for managing addition of a first event service node to a secure multicast group that includes a plurality of other event service nodes in a communication network, wherein each of the event service nodes is capable of establishing multicast communication and serving as a key distribution center, wherein each event service node is created and stored within a domain of a directory server system, wherein each event service node is logically represented by a binary tree having a root node, intermediate nodes, and leaf nodes, wherein the event service nodes are represented by the leaf nodes, the communication system comprising:

a group controller that is represented by the root node and that creates and manages secure multicast communication among a plurality of event service nodes, in which the event service nodes each have a private key;

a computer-readable medium comprising one or more instructions which, when executed by one or more processors, cause the one or more processors to carry out the steps of:

authenticating the first event service node with a subset of the event service nodes that are affected by an addition of the first event service node to the multicast group, based on key information stored in a directory;

receiving a plurality of private keys from the subset of nodes;

generating a new private key for the first event service node;

communicating the plurality of private keys and the new private key to the first event service node;

communicating a message to the subset of nodes that causes the subset of nodes to update their private keys.

25. A computer-readable medium carrying one or more sequences of instructions for managing addition of a first event service node to a secure multicast group that includes a plurality of other event service nodes in a communication network, wherein each of the event service nodes is capable of establishing multicast communication and serving as a key distribution center, wherein each event service node is created and stored within a domain of a directory server system, wherein each event service node is logically represented by a binary tree having a root node, intermediate nodes, and leaf nodes, wherein one of the event service nodes is a group controller and is represented by the root node, and wherein the other event service nodes are represented by the leaf nodes, wherein execution of the one or more sequences of instructions by one or more processors causes the one or more processors to perform the steps of:

authenticating the first event service node with a subset of the event service nodes that are affected by an addition of the first event service node to the multicast group, based on key information stored in a directory;

receiving a plurality of private keys from the subset of nodes;

generating a new private key for the first event service node;

communicating the plurality of private keys and the new private key to the first event service node;

communicating a message to the subset of nodes that causes the subset of nodes to update their private keys.

26. A secure network communication system, comprising a plurality of group controllers coupled to a communication network, each group controller comprising:

a processor;

a memory coupled to the processor using a bus;

one or more sequences of instructions stored in the memory for managing addition of a first event service node to a secure multicast group that includes a plurality of other event service nodes in a communication network, wherein each of the event service nodes is capable of establishing multicast communication and serving as a key distribution center, wherein each event service node is created and stored within a domain of a directory server system, wherein each event service node is logically represented by a binary tree having a root node, intermediate nodes, and leaf nodes, wherein one of the event service nodes is a group controller and is represented by the root node, and wherein the other event service nodes are represented by the leaf nodes, wherein execution of the one or more sequences of instructions by one or more processors causes the one or more processors to perform the steps of:

authenticating the first event service node with a subset of the event service nodes that are affected by an addition of the first event service node to the multicast group, based on key information stored in a directory;

receiving a plurality of private keys from the subset of nodes;

generating a new private key for the first event service node;

communicating the plurality of private keys and the new private key to the first event service node;

communicating a message to the subset of nodes that causes the subset of nodes to update their private keys.

* * * * *